US007205510B2

(12) United States Patent
Howick

(10) Patent No.: US 7,205,510 B2
(45) Date of Patent: Apr. 17, 2007

(54) HEATER FOR AN AUTOMOTIVE VEHICLE AND METHOD OF FORMING SAME

(75) Inventor: Shaun Howick, Windsor (CA)

(73) Assignee: W.E.T. Automotive Systems Ltd., Windsor, Ontario ( * ) Notice: Subject to any disclaimer, the term of this patent is extended or adjusted under 35 U.S.C. 154(b) by 0 days.

(21) Appl. No.: 11/085,644

(22) Filed: Mar. 21, 2005

(65) Prior Publication Data
US 2005/0242081 A1 Nov. 3, 2005

Related U.S. Application Data

(60) Provisional application No. 60/555,144, filed on Mar. 22, 2004.

(51) Int. Cl.
*H05B 1/00* (2006.01)
(52) U.S. Cl. .................. 219/529; 219/217; 219/219; 219/528; 219/549; 297/180.12
(58) Field of Classification Search ........... 219/529, 219/543, 545, 217, 219, 528, 549; 297/180.12
See application file for complete search history.

(56) References Cited

U.S. PATENT DOCUMENTS

| 3,287,684 | A |   | 11/1966 | Armbruster, Jr. |
| 3,887,788 | A |   | 6/1975 | Seibel et al. |
| 4,034,207 | A | * | 7/1977 | Tamada et al. ............ 219/517 |
| 4,237,366 | A |   | 12/1980 | Berg |
| 4,410,790 | A |   | 10/1983 | Berg et al. |
| 4,523,085 | A | * | 6/1985 | Grise ...................... 219/528 |
| 4,527,047 | A |   | 7/1985 | Seitz |
| 4,568,281 | A |   | 2/1986 | Harvey et al. |
| 4,628,187 | A |   | 12/1986 | Sekiguchi et al. |
| 4,631,391 | A |   | 12/1986 | Tiepke |
| 4,742,741 | A |   | 5/1988 | Hallberg et al. |
| 4,743,741 | A |   | 5/1988 | Ramus |
| 4,761,541 | A | * | 8/1988 | Batliwalla et al. .......... 219/528 |
| 4,777,351 | A |   | 10/1988 | Batliwalla et al. |
| 4,857,711 | A |   | 8/1989 | Watts |
| 4,882,466 | A |   | 11/1989 | Friel |
| 4,885,457 | A | * | 12/1989 | Au ........................ 219/548 |
| 4,891,500 | A |   | 1/1990 | Bloore |
| 4,910,388 | A |   | 3/1990 | Lorenz et al. |
| 4,919,744 | A |   | 4/1990 | Newman |
| 4,931,627 | A |   | 6/1990 | Watts |
| 4,942,286 | A |   | 7/1990 | Monter et al. |
| 5,006,696 | A | * | 4/1991 | Uchida et al. ............. 219/505 |
| 5,015,824 | A |   | 5/1991 | Monter et al. |

(Continued)

FOREIGN PATENT DOCUMENTS

EP 0 582 734 A1 2/1994

(Continued)

*Primary Examiner*—Robin Evans
*Assistant Examiner*—Vinod Patel
(74) *Attorney, Agent, or Firm*—Dobrusin & Thennisch PC

(57) ABSTRACT

There is disclosed a heater for an automotive vehicle or other article of manufacture. The heater typically includes a first conductive medium and a second conductive medium disposed upon a carrier. In a preferred embodiment, the first conductive medium includes a first section and a second section that are electrically connected by a second conductive medium. The second conductive medium preferably exhibits a positive thermal coefficient.

22 Claims, 10 Drawing Sheets

U.S. PATENT DOCUMENTS

| | | |
|---|---|---|
| 5,045,673 A | 9/1991 | Kelly |
| 5,111,025 A | 5/1992 | Barma et al. |
| 5,132,840 A | 7/1992 | Okada et al. |
| 5,155,625 A | 10/1992 | Komatsu et al. |
| 5,181,006 A | 1/1993 | Shafe et al. |
| 5,198,639 A | 3/1993 | Smuckler |
| 5,204,509 A | 4/1993 | Etters et al. |
| 5,206,482 A | 4/1993 | Smuckler |
| 5,298,721 A | 3/1994 | Smuckler |
| 5,344,591 A | 9/1994 | Smuckler |
| 5,354,966 A | 10/1994 | Sperbeck |
| 5,414,241 A | 5/1995 | Ohashi et al. |
| 5,418,025 A | 5/1995 | Harmand et al. |
| 5,440,425 A | 8/1995 | Kadooka et al. |
| 5,451,747 A | 9/1995 | Sullivan et al. |
| 5,475,530 A | 12/1995 | Fujie et al. |
| 5,517,003 A * | 5/1996 | Kadooka et al. ............ 219/548 |
| 5,594,585 A | 1/1997 | Komatsu |
| 5,702,565 A | 12/1997 | Wu et al. |
| 5,716,536 A | 2/1998 | Yokoto et al. |
| 5,719,378 A | 2/1998 | Jackson, Jr. et al. |
| 5,731,569 A | 3/1998 | Crescenzo |
| 5,824,996 A | 10/1998 | Kochman et al. |
| 5,902,505 A | 5/1999 | Finley |
| 5,904,874 A | 5/1999 | Winter |
| 5,921,100 A | 7/1999 | Yoshinori et al. |
| 5,938,957 A | 8/1999 | Tanahashi et al. |
| 6,078,024 A | 6/2000 | Inoue et al. |
| 6,084,217 A | 7/2000 | Bulgajewski |
| 6,084,219 A * | 7/2000 | Winter ...................... 219/539 |
| 6,093,908 A | 7/2000 | Haag |
| 6,093,910 A | 7/2000 | McClintock et al. |
| 6,105,667 A | 8/2000 | Yoshinori et al. |
| 6,137,085 A | 10/2000 | Nakashima et al. |
| 6,150,642 A * | 11/2000 | Weiss et al. ................ 219/528 |
| 6,153,851 A | 11/2000 | Schneider |
| 6,184,496 B1 * | 2/2001 | Pearce ........................ 219/213 |
| 6,204,479 B1 | 3/2001 | Sickels |
| 6,229,123 B1 | 5/2001 | Kochman |
| 6,294,758 B1 | 9/2001 | Masao et al. |
| 6,307,188 B1 | 10/2001 | Bulgajewski |
| 6,369,369 B2 | 4/2002 | Kochman et al. |
| 6,392,195 B1 | 5/2002 | Zhao et al. |
| 6,426,485 B1 | 7/2002 | Bulgajewski et al. |
| 6,433,317 B1 | 8/2002 | Arx et al. |
| 6,455,823 B1 * | 9/2002 | Bulgajewski et al. ....... 219/548 |
| 6,495,799 B1 | 12/2002 | Pillsbury et al. |
| 6,495,809 B2 * | 12/2002 | Bulgajewski et al. ....... 219/548 |
| 6,512,203 B2 | 1/2003 | Jones et al. |
| 6,541,737 B1 | 4/2003 | Eksin et al. |
| 6,559,426 B2 | 5/2003 | Jirmann |
| 6,626,488 B2 | 9/2003 | Pfahler |
| 6,629,725 B1 | 10/2003 | Kunkel et al. |
| 6,713,733 B2 * | 3/2004 | Kochman et al. ........... 219/549 |
| 7,049,559 B2 * | 5/2006 | Ishii et al. .................. 219/549 |
| 2003/0102296 A1 | 6/2003 | Nelson et al. |

FOREIGN PATENT DOCUMENTS

| | | |
|---|---|---|
| EP | 0 356 087 | 9/1994 |
| EP | 1 001 655 A2 | 5/2000 |
| EP | 1 132 028 A1 | 9/2001 |
| JP | 2001-237104 | 8/2001 |
| JP | 2001-326105 | 11/2001 |
| JP | 2002-270403 | 9/2002 |
| JP | 2003-109804 | 4/2003 |
| JP | 2003-217902 | 7/2003 |
| JP | 2003-217903 | 7/2003 |
| JP | 2003-217904 | 7/2003 |
| WO | WO 00/10177 | 2/2000 |
| WO | WO 02/32188 | 10/2000 |
| WO | WO 2004/001775 A1 | 12/2003 |

* cited by examiner

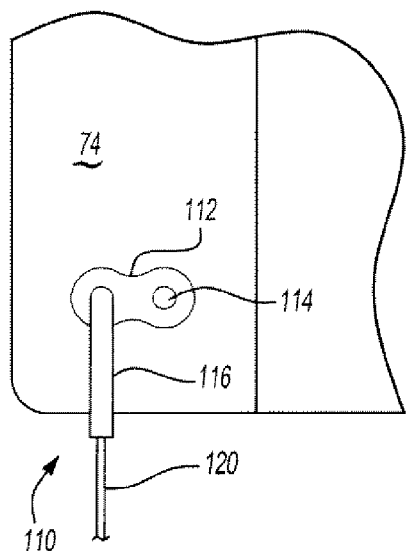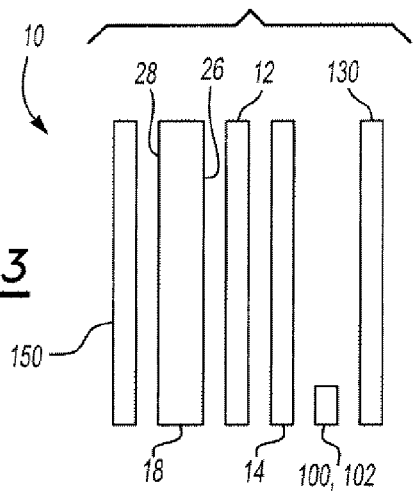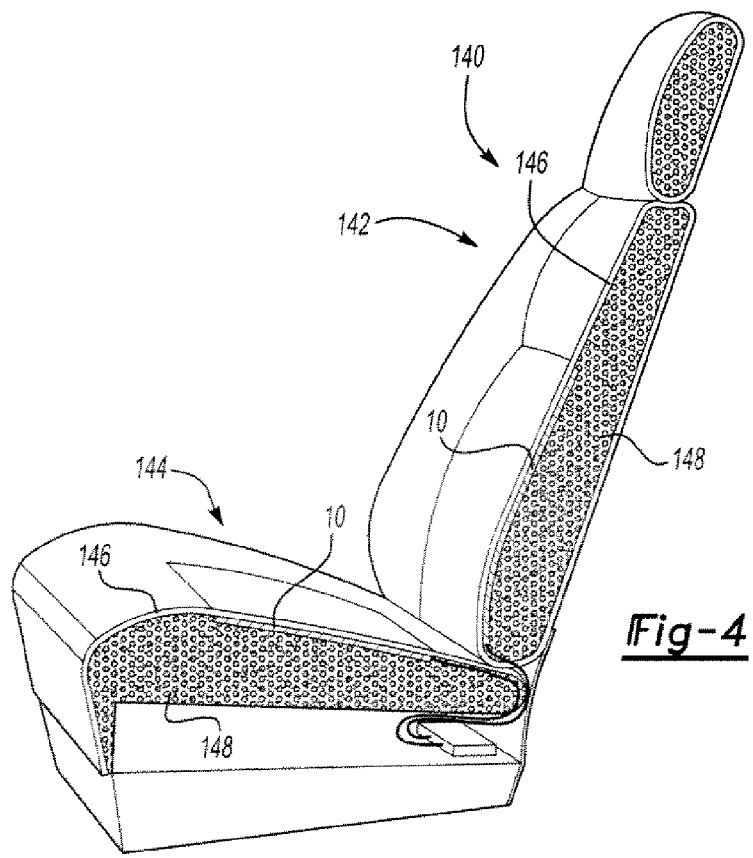

7,205,510 B2

HEATER FOR AN AUTOMOTIVE VEHICLE AND METHOD OF FORMING SAME

FIELD OF THE INVENTION

The present invention relates generally to heaters and more particularly to heaters for use in seats, mirrors, handles or other locations of automotive vehicles, transportation vehicles or other articles of manufacture.

BACKGROUND OF THE INVENTION

For many years, industry has been concerned with designing improved heaters for articles of manufacture such as seats, mirrors or handles of furniture, automotive vehicles or other transportation vehicles. Examples of such heaters are disclosed in U.S. Pat. Nos. 6,084,217, 5,451,747, 5,045,673, 4,931,627 and 4,857,711 all of which are expressly incorporated herein by reference for all purposes.

Many of these prior heater designs suffer from one or more drawbacks. As one example, many prior heater designs were not configured to accommodate systems such as ventilators, which may also be integrated into an article of manufacture such as a seat of an automotive vehicle. As another example, many prior heater designs employed relatively high cost raw materials, high cost manufacturing processes or the like, which caused the heaters to become relatively expensive.

The present invention therefore provides a heater that addresses one or more of the aforementioned drawbacks or addresses other drawbacks that will become more apparent from a reading of the following description.

SUMMARY OF THE INVENTION

Accordingly, the present invention provides a heater or heater assembly that includes one or more conductive mediums disposed upon a flexible carrier.

According to one embodiment, the heater includes a first conductive medium disposed upon the carrier and the first conductive medium includes a negative section having a plurality of first extensions and a positive section having a plurality of second extensions. A second conductive medium electrically connects the positive section with the negative section and a plurality of openings extend through the heater.

According to another embodiment, the heater assembly includes a control element or control heater and a main heater disposed upon the flexible carrier. The control element typically includes a first conductive medium formed of a PTC material while the main heater includes a first conductive medium formed of an NTC or CTC material. Preferably, electrical current flows through the control element to and through the main heater such that the control element controls the amount of electrical current flowing through the main heater.

BRIEF DESCRIPTION OF THE DRAWINGS

The features and inventive aspects of the present invention will become more apparent upon reading the following detailed description, claims and drawings, of which the following is a brief description:

FIG. 2A is a top view of an exemplary alternative electrical connection suitable for a heater of the present invention.

FIG. 3 is a blown up side cross-sectional view of the exemplary heater of FIGS. 1 and 2 with additional exemplary components in accordance with an exemplary aspect of the present invention;

FIG. 4 is a partially cut away perspective view of a seat of an automotive vehicle formed in accordance with an exemplary aspect of the present invention;

DETAILED DESCRIPTION OF THE INVENTION

Figure 1:
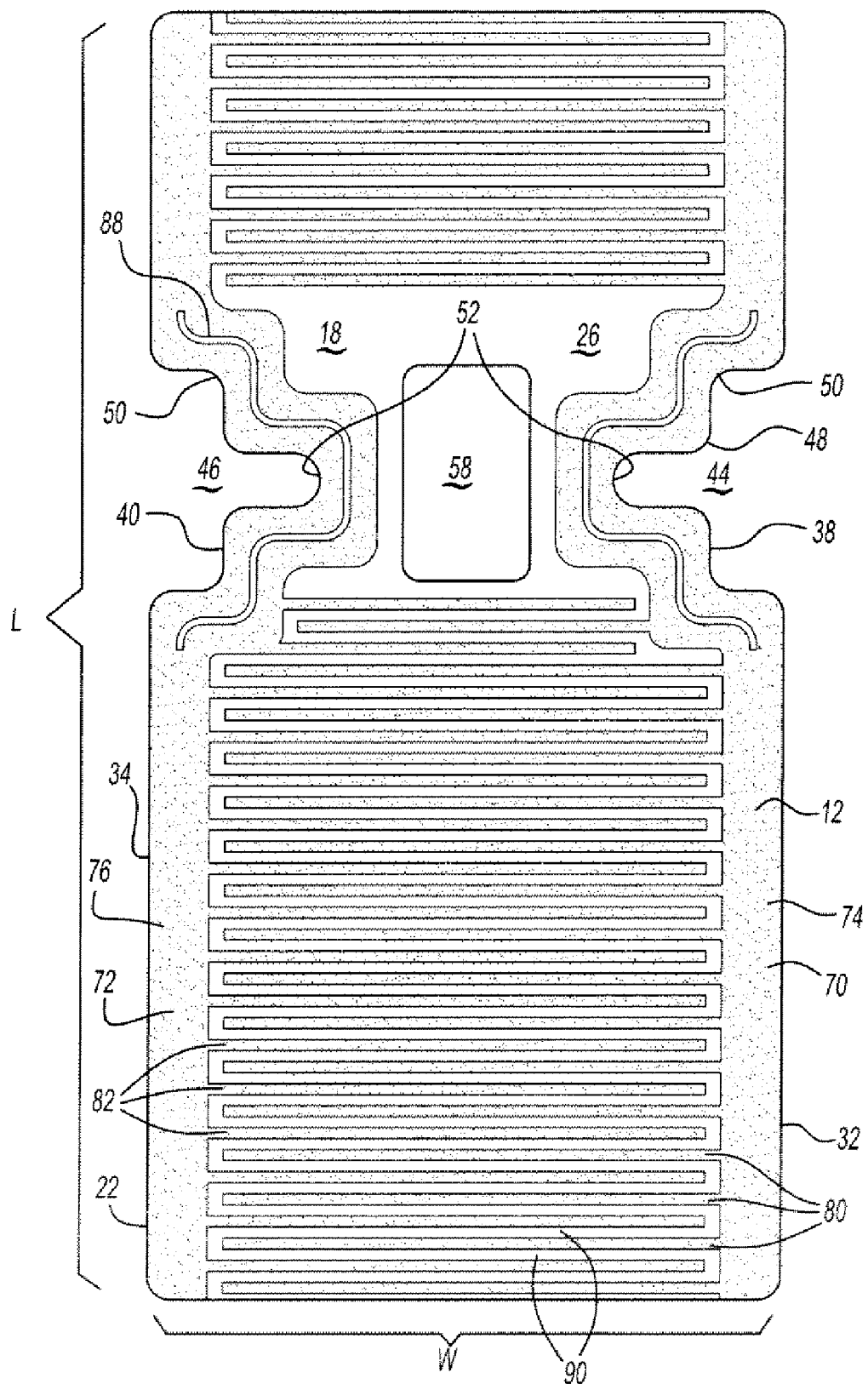
FIG. 1 is a top view of an exemplary partially formed heater in accordance with an exemplary aspect of the present invention.

The present invention is predicated upon providing an improved heater suitable for integration into a variety of articles of manufacture. For example, the heater may be integrated into or attached to carriers (e.g., members, structures, panels, floors, walls or the like) of various articles of manufacture such as buildings, furniture, transportation vehicles (e.g., boats, trains, airplanes, busses) or the like. Alternatively, the heater may be integrated into or attached to various components of transportation vehicles such as seats, mirrors or mirror assemblies (e.g. rearview mirrors, side view mirrors or the like), gear shifters, panels, footwells, floor mats, cargo or bed liners, windows or other components. The heater is particularly suitable for integration into a seat of an automotive vehicle. More particularly, the heater is suitable of integration with the seat portion, back portion, head rest portion, or a combination thereof of a vehicle seat.

In another automotive application, the present invention may be used in a steering assembly. As such, the heater may be placed on or integrated with various regions of a steering wheel including the hub, wheel, spokes, turn signal or shifter of the steering wheel assembly. Likewise, the heater of the present invention may be located anywhere throughout the vehicle, and most advantageously, with components that generally come in contact with an occupant of the vehicle including arm rest, rear view mirrors, user control interfaces and otherwise.

Outside of the automotive application, it is foreseeable that the present invention may be incorporated into other applications including Bed mattresses, wheel chairs, articles of clothing, or any other object that may come into contact with a person.

Furthermore, the present invention may be used outside of personal comfort applications including: infrared sensing technology, heating electrical or mechanical components or even heating a fluid through a submersion of the heater or an application to the outer walls of a container. Also, the heater may include or be integrated with: an antenna for reception or transmission of radio frequencies; a sensor such as a seat occupant sensor (e.g. for use with an airbag or otherwise), or a sensor for children car seats; a warning device for signaling an alarm when a temperature (internal or otherwise) of the vehicle is undesirably high or low; combinations thereof or the like. In some or all of the previous applications, the heater may be configured with a pressure sensor to determine the presence of an applied force acting on the heater or the sensor.

The heater of the present invention may exhibit one or more advantages as compared to previous heaters. As one example, the heater may control its heat output without employing components such as a controller, a thermostat, a temperature sensor, combinations thereof or the like. Of course, it is contemplated that these components may be included with the heater to assist in controlling or regulating the amount of heat output by the heater. As another advantage, the geometry, sizing, materials and configuration of the heater and its components can assist in forming a more effective heating system within a vehicle seat or other article of manufacture. As an example, a preferred heater may be formed of materials that add flexibility to the heater for assisting in minimizing noise that might otherwise be produced by the heater. As another example, a preferred heater may include one or more contours, openings or cavities for aiding the bending of the heater thereby allowing the heater to conform to contours of an article of manufacture particularly for assisting in attaching the heater to the article.

In one or more alternate embodiments, the heater of the present invention may also be adapted to selectively activate one or more regions of the heater to provide selective heating, to manipulate the heat output generated by the heater or both. In the one or more alternate embodiments, a user can preferably control one or both of the location and intensity of heat provided by the heater of the present invention.

Generally, the heater of the present invention will include one or a combination of the following components:

1) a carrier that is preferably configured as a flexible panel;
2) a first conductive medium disposed upon the carrier, the first conductive medium preferably including a first section and a second section wherein each section preferably includes a base portion and a plurality of extensions extending from the base portion;
3) a second conductive medium for interconnecting the first section to the second section, the second conductive medium preferably including a plurality of resistive strips, which preferably interconnect the plurality of extensions of the first section to the plurality of extensions of the second section wherein the second conductive medium preferably exhibits positive thermal coefficient characteristics.

Optionally, the first conductive medium can include a third section for assisting the heater in providing multiple heat output levels or for allowing selective heating of different locations of the heater.

Figure 2:
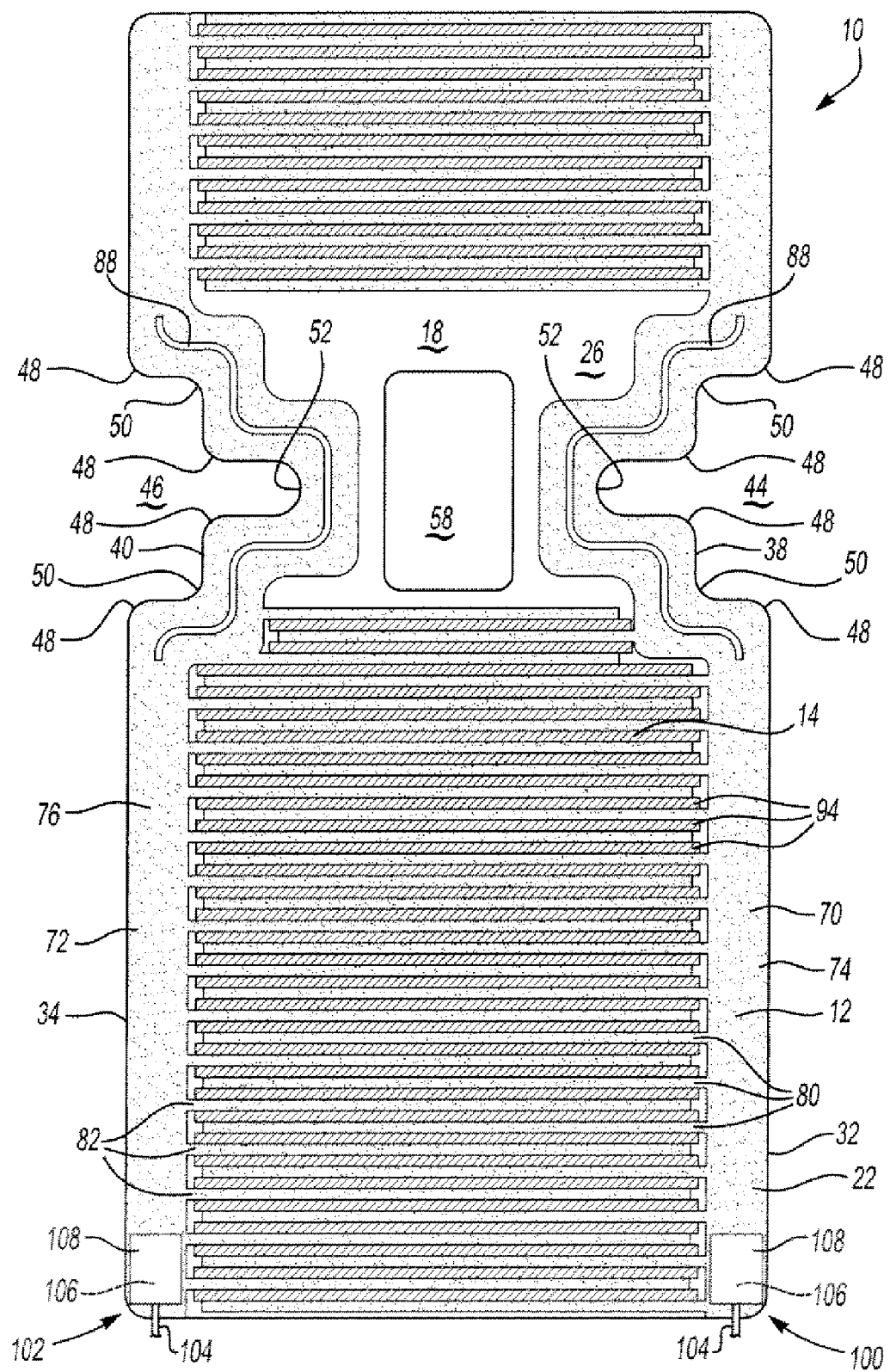
FIG. 2 is a top view of the exemplary heater in FIG. 1 after further formation of the heater in accordance with an exemplary aspect of the present invention.

Referring to FIGS. 1, 2 and 3, there is illustrated the formation of an exemplary heater 10 in accordance with the present invention. The heater 10 includes a first conductive medium 12 and a second conductive medium 14 disposed upon a carrier 18. Generally, the heater 10 is configured as a flexible panel (i.e., with opposing surfaces and a thickness therebetween) although other shapes or configurations may be employed as well.

For example, while in one embodiment the carrier 18 may be flexible, it is foreseeable that the carrier may alternatively be rigid or semi-rigid or non existent altogether (discussed in greater detail below). Regardless of the rigidity characteristics of the carrier 18, the carrier may be formed in numerous shapes and configuration as desired depending on the application (e.g. seat, seat back, head rest, mirror, steering wheel, or any other article that may be heated to enhance the environment for a user). Moreover, the carrier may include contours for assisting in stress relief particularly when the heater may be subject to stresses from pressure, movement or otherwise.

The carrier 18, as illustrated, is configured as panel with opposing surfaces 26, 28. As seen in the particular embodiment of FIGS. 1, 2 and 5, the carrier 18 is substantially elongated and generally rectangular and more preferably is hourglass shaped. As shown, the carrier 18 has a length (L) and a width (W) and includes an outer peripheral edge 22 extending substantially continuously about the carrier 18 substantially defining the shape of the carrier 18. The peripheral edge 22 is shown to include a first lengthwise edge 32 opposing a second lengthwise edge 34.

In the particular embodiment illustrated, the first lengthwise edge 32 and the second lengthwise edge 34 have cutouts for helping to form the hourglass shape. For example, the lengthwise edges 32, 34 respectively define a first indentation 38 and a second indentation 40, which respectively define a first concavity 44 and a second concavity 46. The first indentation 38 generally opposes and is substantially a mirror image of the second indentation 40. Both indentations 38, 40 may include one or a plurality of contours 48, 50, 52 at least partially defining the cavities 44, 46. In the particular embodiment illustrated, both indentations 38, 40 include two pair of opposing convex contours 48, one pair of opposing concave contours 50 and one central concave contour 52. The carrier 18 may also include an opening 58 located between the first and second indentations 38, 40 and which is generally rectangular.

The heater, carrier or both may be shaped as desired and such shape may depend upon the application of the heater. Thus, the carrier or heater shape should not limit the present invention unless otherwise stated. As examples, the heater, carrier or both may include configurations that are circular, oval, elliptical, square, rectangular, geometric, non-geometric, symmetric, or asymmetric, or combinations thereof or the like. Furthermore, the heater, the carrier or both may be preformed (e.g. as planar or contoured) to correspond to an article such as a steering wheel or other article. Alternatively, the heater, the carrier or both may be flexible to allow of such correspondence.

In a preferred embodiment of the present invention, the carrier may be attached to one or more components of an article of manufacture (e.g. a seat, a mirror or the like).

Alternatively, a first carrier may provide a release surface, which allows the first and second conductive medium to be transferred to one or more components of the article such that the one or more components become the carrier. This may be achieved according to various techniques such as appliques, dissolvable substrates, removable substrates, or the like. Alternatively, the first and second conductive medium may be placed on one or more of the components of the article itself through printing, spraying, rolling, dabbing, brushing, pouring, or the like, again such that the one or more components become the carrier of the heater.

It is contemplated that the carrier 18 may be conductive, nonconductive, or partially conductive. This includes electric conductivity, thermal conductivity and diffusion. Also, for attachment purposes, the carrier may be configured to hold and maintain a static charge thereby allowing the carrier to attach itself to a component of an article (e.g. a mirror assembly, a seat or the like), with or without the use of adhesion or fastening techniques.

Alternatively, or in combination with the above, the carrier may further include one or more adhesive materials or layers for attaching the carrier to a component. The adhesive material may be applied to the carrier or, the carrier itself may comprise of adhesive material or have adhesive characteristics. The adhesive may be applied using such techniques as printing, spraying, rolling, dabbing, brushing, pouring or otherwise placed on one or both sides of the carrier.

The carrier 18 may be formed from various materials including polymeric materials such as plastics, elastomers, thermoplastics, composites or the like. The carrier 18 may also be formed of woven or non-woven fabric materials, paper materials, impregnated fibers, fibrous materials or the like. The carrier 18 preferably has a thickness between about 1 micron or less and 1 centimeter or greater, more preferably between about 10 microns and 1 millimeter, still more preferably between about 50 microns and about 200 microns.

One preferred material for the carrier is a polyester film that is commercially available under the tradename MELINEX®, designation number ST505, from the DuPont Company. Another preferred material for the carrier is a spunbound Olefin that is commercially available under the tradename TYVEK® also from the DuPont Company. Still another preferred material for the carrier is a polyester film that is commercially available under the tradename CETUS®, designation number CP2101, from the Cetus Company. Yet another preferred material for the carrier is a nylon polyester or polyether imide that is commercially available under the tradename ULTEM®, designation number 1000 or otherwise, from the General Electric Corporation.

Of course, other types of base substrate material are available for the carrier such as ceramic, glass, polymeric material (e.g. plastic, elastomers, thermoplastic, thermoset, or the like), polyesters, polyethylene, Mylar, woven material (e.g. nylon or cloth), or otherwise.

Preferred carriers have advantageous properties such as strength, flexibility, rigidity, elasticity, dielectric properties, flexibility, a combination thereof or the like depending upon their application. Carriers may also be transparent, opaque, reflective or the like. Preferably, carriers are temperature resistant (e.g. up to 80° C. or more). Furthermore, carriers may exhibit relatively high acceptance to screen printing materials (e.g. polymers).

In preferred embodiments, particularly for seating applications, but for other applications as well, materials used for the carrier of the present invention exhibit an elongation at failure of as much or greater than 15%, more preferably greater that 35%, even more preferably greater than 50% and still more preferably greater than 70%. Also in preferred embodiments, the material used for the carrier of the present invention exhibit a dielectric constant of up to or greater than 0.5, more preferably greater than 1.0 and even more preferably greater than 2.0.

The first conductive medium 12 may be disposed upon the carrier 18 in a variety of configurations (e.g., in spaced parallel lines, zig-zags, serpentine, opposing interdigitated lines, etc.). Typically, the first conductive medium 12 is divided into a first or negative section 70 and a second or positive section 72 that are spaced apart from each other upon the carrier 18. Preferably, the negative section 70 does not directly electrically connect with the positive section 72. As used herein the terms "positive" and "negative" are only used because one of the sections 70, 72 will be electrically connected to a positive terminal of a power source while the other is electrically connected to a negative terminal as is further described below. It shall be understood that the sections 70, 72 may be interchanged or switched. Preferably, each of the sections 70, 72 respectively includes a base portion 74, 76 and a plurality of extensions 80, 82 extending outwardly from the base portions 74, 76. As shown, the plurality of extensions 80 of one section 70 are spaced apart from the plurality of extensions 82 of the other section 72. Moreover, the plurality of extensions 80 of the negative section 70 are spaced apart from each other and the plurality of extensions 82 of the positive section 72 are also spaced apart from each other.

In the particular embodiment illustrated, the base portion 74 of the negative section 70 extends along substantially the entire first lengthwise edge 32 of the carrier 18 while the base portion 76 of the positive section 72 extends along substantially the entire second lengthwise edge 34 of the carrier 34. As such both base portions 74, 76 include the same indentations 38, 40, cavities 44, 46 and contours 48, 50, 52 as the lengthwise edges 32, 34 of the carrier 18. The base portions 74, 76 also include an opening 88 extending down the center of the base portions 74, 76 adjacent the indentations 38, 40, cavities 44, 46 and contours 48, 50, 52.

The extensions 80, 82 are illustrated as elongated fingers that extend from one of the base portions 74, 76 toward the other of the base portions 74, 76 without actually contacting the other of the base portions 74, 76. As shown, particularly in FIG. 1, wherein only the first conductive medium 12 is disposed upon the carrier, the extensions 80 of the negative section 70 are interdigitated or intermittent with respect to the extensions 82 of the positive section 72 thereby forming gaps 90 between the extensions 80, 82.

The first conductive medium 12 may be formed of a variety of materials such as metals, conductive plastics, combinations thereof or the like. While it is contemplated that the first and second sections 70, 72 of the first conductive medium 12 may be formed of different materials, it is preferred that they be formed of one material. In a preferred embodiment, the first conductive medium 12 is formed of a polymeric material, which may be printed (e.g., screen printed) upon the carrier 18.

As an exemplary embodiment, the material for the first conductive medium 12 is a polymeric material such as a polymer thick film composition sold under the tradename POLYMER SILVER CONDUCTOR 5025, commercially available from DuPont, 1007 Market Street, Wilmington, Del. 19898. In such an embodiment, the first conductive medium 12 is typically screen printed upon the carrier 18 such that the medium 12 has a thickness of about 2 micrometers to about 4 millimeters, more preferably about 6 micrometers to about 1 millimeter and even more preferably about 12 to about 15 micrometers. Once printed, the conductive medium 12 is typically exposed to heat for curing. For example the carrier 18 and medium 12 may be placed within a box oven and the medium 12 cured for about 1 to about 10 minutes at a temperature between about 80° C. and about 180° C., more preferably for about 3 to about 8 minutes at a temperature between about 100° C. and about 140° C., still more preferably about 5 to about 6 minutes at a temperature of about 115° C. to about 125° C. As an alternative example, for a reel-to-reel screen printer, the carrier 18 and medium 12 may be exposed to temperatures of about 100° C. to about 200° C. for about 20 seconds to about 3 minutes, more preferably temperatures of about 120° C. to about 160° for about 40 seconds to about 2 minutes, still more preferably a temperature of about 140° C. for about one minute for curing the medium 12.

While, one or more configurations for the base portions have been discussed, it is contemplated that the base portions of the present invention may be arranged in numerous alternative configurations as well. As such, the base portions may be on opposite, adjacent or same sides of a carrier or may partially or completely overlapping having an interposed insulating material. The shape of the base portions may be geometric or non-geometric. Similarly, the base portion may be symmetrical or asymmetrical in shape. Some possible base portion shapes include: shapes having one or more arcuate boarders (e.g. round, circular, elliptical, oval, helical, combinations thereof or the like), shapes having one or more linear boarders (e.g. rectangular, square, equilateral or the like). It is also contemplated that the base portions may include a variety of both arcuate and linear borders.

In other embodiments, one base portion may be partially or fully enclosed within the other base portion. As an example, a first U-shaped base portion could partially surround a second corresponding U-shaped base portion with interdigitated or otherwise configured extensions extending from the base portions. As another example, a first base portion may be shaped in an enclosed configuration (e.g. as a circle, square, rectangle or the like) such that the second base (which may be of corresponding or non-corresponding shape) portion is substantially enclosed within the first base portion. In either example, the heater may include extensions in any configuration described herein.

While only two base portions are shown, it is foreseeable that additional base portions may be used. Also, the number of electrically positive base portions may or may not be equal to that of the electrically negative base portions.

Accordingly, as with the base portions, the extensions can be arranged in different patterns with respect to the base portions and each other. Some possible patterns include interdigitated serpentine, straight, curved, spiral, rectangular, zigzag, or otherwise. In the embodiment shown in FIG. 2, each first extension from the first base portion is separated from the next closest first extension by no more than one second extension from the second base portions. However, it is contemplated that a first extension from the first base portion may be separated from the next closest first extension by two or more second extensions from the second base portion. In such an embodiment, it is preferably although not required that the second conductive medium interconnects only first extensions from the first base portion with second extensions from the second base portion.

Additionally, it is contemplated that two sections of the first conductive medium may form an overlapping relationship in order to create a more desirable circuit for selective heat generation of the heater. For example, a first section of the first conductive medium may be configured in an overlapping relationship with a second section. In such an instance, an insulating or nonconducting material typically interposes the first and second sections, to prevent currents from traveling directly from one section to another section without passing through the second conductive medium. Of course, direct passage of current between sections may be desirable in some instances (e.g. such that current only passes through a portion of the second conductive medium). However, the first and second sections may alternatively be interposed by the second conductive medium, or otherwise to provide a heating circuit. For example, a second conductive medium may be sandwiched between a portion of the first and second section. As such, when a current travels from the first and second section, it is possible for the second conductive to generate heat therebetween.

This overlapping relationship of the different sections of the first conductive medium provides the ability to form more intricate circuit designs. One advantage of having more intricate circuits is the ability to generate multiple heat outputs from a single heating unit. Another advantage is the ability to provide a heating unit having more then one heating regions that are selectively activated.

In any of the possible base portion configurations, the width and thickness of the portion may be consistent throughout, variable, or progressively narrowing or expanding. Likewise, the width and thickness of an extension from the first or second base portions may be consistent, variable, or progressively narrowing or expanding. Furthermore, the thickness, length and width of the first and second extensions may vary throughout the heater. Moreover, the extensions may be parallel, skew, nonparallel or the like relative to each other, the base portions, the extensions from the other base portion or relative to the second conductive medium.

As with the base portions, the extensions from either of the base portions may overlap each other wherein nonconductive medium is placed between the overlapped regions.

The material of the base portion and the extensions may be the same or different material depending on the application. Moreover, the extensions may be interconnected by the second conductive medium such that the base portions are connected.

Alternatively, it is contemplated that there are no extensions and the base portions are in direct contact with a conductive medium. Examples of this configuration includes the overlapping of the base portions having an interposed conductive medium. In another example, the base portions may be configured adjacently, or otherwise, having a conductive material interposed. In the above examples, the application of more than two base portions may be desired.

Referring to FIGS. 2 and 3, the second conductive medium 14 may be disposed upon the carrier 18 in a variety of configurations. The second conductive medium 14 may be continuous, intermittent, planar, geometric, contoured, combinations thereof or the like. Preferably, the second conductive medium 14 electrically connects the positive section 72 of the first conductive medium 12 with the negative section 70 of the first conductive medium 12.

In the exemplary embodiment illustrated in FIG. 2, the second conductive medium 14 includes a plurality of strips 94, which are shown as separate from each other, but which may be interconnected. Each of the strips 94 is elongated and extends with and/or preferably parallel to the extensions 80, 82 of the first conductive medium 12 and each strip 94 electrically connects an extension 80 of the negative section 70 with an extension 82 of the positive section 72. As shown, each of the strips 94 overlaps and directly contacts one extension 80 of the negative section 70 and one extension 82 of the positive section. 72.

It is also for preferred, but not necessarily required, that each of the plurality of strips 94 have substantially the same size and shape and that the strips 94 be substantially uniformly spaced apart from each other. Moreover, it is preferable for the strips 94 to have uniform densities compared to each other and throughout each strip 94. In this manner, the heater 10 can typically produce a more uniform heat intensity along the length and/or width of the heater 10.

The second conductive medium 14 may be formed of a variety of materials including metal, plastics or combinations thereof. Preferably, the material exhibits relatively high positive thermal coefficient (PTC) as will be discussed further below. While it is contemplated that the strips 94 may be formed of different materials, it is preferred that they be formed of one material. In a preferred embodiment, the second conductive medium 14 is formed of a polymeric material, which may be printed (e.g., screen printed) upon the carrier 18.

In an exemplary embodiment, the material for the second conductive medium 14 may be a polymeric material such as a polymer thick film composition sold under the tradename PTC CARBON RESISTOR 7282, commercially available from DuPont, 1007 Market Street, Wilmington, Del. 19898. In such an embodiment, the second conductive medium 14 is typically screen printed upon the carrier 18 such that the medium 14 has a thickness of about 1 micrometer to about 1 millimeter, more preferably about 3 micrometers to about 10 micrometers and even more preferably about 6 to about 8 micrometers. Alternate printing methods include silk screen printing, ink jet printing or the like. Once printed, the conductive medium 14 is typically exposed to heat for curing. For example, the carrier 18 and medium 14 may be placed within a box oven and cured for about 2 to about 30 minutes at a temperature between about 90° C. and about 200° C., more preferably about 5 to about 15 minutes at a temperature of about 110° C. to about 150° C., still more preferably about 10 minutes at temperature of about 130° C. As another example, for a belt drier, the carrier and medium 14 may be exposed to temperatures of about 110° C. to about 210° C. for about 1 minute to about 20 minutes, more preferably temperatures of about 130° C. to about 170° for about 2 minutes to about 10 minutes, still more preferably a temperature of about 150° C. for about 3 to about 5 minutes.

Other conductive mediums used in the above printing methods include aqueous polymers including conductive fillers (e.g. conductive metal powder, metallic oxide, silver, copper or otherwise), resistive fillers (e.g. carbon or otherwise), films (e.g. polyurethane, UV curable Polymeric dielectric composition, thermosetting resins (e.g. epoxies, phenol resins, or the like), or otherwise), ethylene vinyl acetate co-polymer resin having black carbon or a combination thereof. Preferably, the ink is impermeable to light and may include one or more of the following binders: resin-based acrylic ink, borosilicate lead-glass, thermosetting resins (e.g. epoxy, phenol, melamine resin), or conductive powder.

The second conductive medium may be applied in a variety of patterns alternative to that which is shown. In one embodiment, the conductive medium may emulate (e.g. extend parallel) the pattern of the first and second base portion. Preferably, the conductive medium is at least partially interposed between the extensions of the first and second base portions. When provided as strips or otherwise, the conductive material may be parallel, angled, skew, perpendicular, serpentine with respect to the extensions of the base portions or the base portions themselves. Also the pattern of the second conductive medium may be comprised of concentric or non-concentric geometric configurations, e.g. circles, squares, oval, or otherwise. Furthermore, the second conductive medium may be randomly or systematically place between extension of the base portions, or between the base portions, and may comprise a plurality of strips having cut out portions. The strips of the conductive material may also be sectioned or broken into pieces.

While preferred material for the first and second conductive mediums have been disclosed, it is contemplated that other materials may be employed as layers or otherwise for providing part or all of the first and second conductive mediums. Examples of these materials include: foil tape, transfer paper, strips sheets, sleeves, strands of electrically conductive thread, wire, deposited metal, plated material, sewn material or otherwise. Other materials include: metals (e.g. aluminum, chromium, nichrome, or otherwise), carbon, film, foam (either thermally or non thermally conductive) (e.g. Comfortem® by foam international), electrically conductive woven fabric having a conductive coating such as silver, polymeric material (applied as a film or printed, discussed more below).

The heater 10 of the present invention also typically includes one or more (e.g. a pair of) electrical connections 100, 102. Preferably, each of the connections 100, 102 is respectively in electric communication with one of the base portions 74, 76 of the negative and positive sections 70, 72.

It shall be understood by those skilled in the art that a variety of electrical connections may be employed. In the particular embodiment of FIG. 2, each of the electrical connections 100, 102 includes a wire 104 (e.g., a coated copper conductive wire) having an end 106 that is attached (e.g. soldered) to a foil patch 108 (e.g., of electrically conductive tape) and the patch 108 with the end 106 is attached (e.g., adhered) to one of the base portions 74, 76. In an alternative exemplary embodiment, and referring to FIG. 2A, an electrical connection 110 is employed wherein a member 112 includes a rivet 114 connected to one of the base portions 74 and an eyelet 116 connected to a wire 120.

Advantageously, the heater of the present invention may be formed with only one or two electrical connections for providing a current through the base portions, the extension, the second conductive medium (e.g. the strips) or a combination thereof. Of course, additional connections may be used if desired or needed. As an added value, the heater 10 can be formed with the entirety of the first and second conductors supported by the single carrier 18 without requiring additional layers for supporting the conductors. Of course, additional layers may be used if needed or desired.

The electrical connections may be located on the same side of the carrier. Alternatively, the electrical connections may be located on opposite or adjacent sides of the carrier. Also, the electrical connections may be diagonally opposite each other on the carrier. Thus, the electrical connections may be situated such that the summation of the electrical paths between adjacent portions of the extension are substantially equivalent or substantially non equivalent.

The electrical connections may be integrated into a single unit, having both positive and negative leads, or may be separated into two or more connections. Furthermore, the electrical connections may be integrated into a single extension or "tail", or multiple "tails", used to electrically connect the heater to a power or energy source (e.g. a battery).

The heater of the present invention may be capable of operating at one or multiple heat outputs. Various techniques may be used for producing multiple heat outputs. For example, two or more circuits may be configured to operate at different output levels and may be disposed or printed on one, two or more carriers. Alternatively, referring to any of the embodiments contained herein, two or more sets of electrical connections could deliver different energy levels (e.g. voltages) to one, two or more circuits printed onto one, two or more carriers. Moreover, one, two or more electrical connections may be configured for delivering different output levels for delivering different output levels to the above configured heaters.

The present invention may further comprise one or more control safety features including: thermostat, control module with Negative Temperature Coefficient (NTC) resistor, Positive Temperature Coefficient fuse or some other temperature sensing device. Also, a Constant Temperature Coefficient (CTC) may be used for eliminating the effect of the temperature of the heating element on the amount of heat generated by the heating element. The above features can allow the system to shut down upon sensing of excessive temperatures or a short in the system.

Also, the present invention may be configured with one or more switches (e.g. a latch switch or momentary switch), for applying a current to the heater of the present invention. For example, a control module may be used in conjunction with a momentary switch for turning the heating device on and off. Alternatively, a switch (e.g. an on/off switch) may be used to physically connect and/or disconnect a circuit that includes the heater with an energy source. Other switches that may be used includes a voltage control potentiometer, multiple position switch for allowing choice of temperature settings (e.g. high-low-off), multi-pole switch or otherwise.

The heater of the present invention is electrically connected to an energy source to generate a current through the heater to produce heat. The energy source may provide an alternating current, a direct current, or a combination thereof. In an automotive application, preferably the heater is electrically connected to an automotive energy supply, (e.g. 12 volt battery). Alternatively, or additionally, the heater may be connected to the alternator, control module or other electrical components in the vehicle.

In any of the discussed embodiments, including FIG. 3, an insulation layer 130 may be laminated over the conductive mediums 12, 14 of the heater 10. The insulation layer 130 may be formed of fleece, gauze or the like and may be fastened to the carrier 18 via adhesive or otherwise.

While FIG. 3 has been illustrated with an insulation layer 130, it is contemplated that the heater 10 may advantageously be formed without any such additional insulation layer 130. Moreover, it is contemplated that the insulation layer 130 may be provided by the seat (e.g., as part of a trim layer) and that the insulation material may not be specifically adhered or otherwise attached to the heater 10. The application of the insulating material is numerous and at a minimum includes the methods used below in applying the protective coating.

As another option, the first conductive medium 12, the second conductive medium 14 or both may be fully or partially covered with a protective coating. In a preferred embodiment, the first and second conductive mediums 12, 14 are coated with a protective dielectric coating formed of a polymeric dielectric composition. Preferably, the coating is curable (e.g., UV curable), solvent less or a combination thereof. The coating may be applied to the conductive mediums 12, 14 by several methods such as printing, spraying, rolling, dabbing, brushing, pouring or the like, but is preferably screen printed upon the mediums 12, 14. The coating may be up to 5 millimeters thick or greater and is preferably between about 10 microns and about 4 millimeters thick, more preferably between about 100 microns and about 3 millimeters thick (e.g., between about 1 to about 1.2 millimeters thick). In a preferred embodiment, the protective layer has electrical, or thermal, insulating characteristics.

Materials available for both the insulating layer and protective layer include the same materials used for the carrier. Additional layers that may be used for the insulating and protective layers having di-electric properties include: paper, film (e.g. polyurethane, UV curable polymeric dielectric composition, thermosetting resins or otherwise), vinyl sheet, fleece, gauze, flexible sheets (e.g. elastomeric, polyester terephthalate, polycarbonates, or otherwise), foam (e.g. thermally conductive, non-thermally conductive, polyurethane, neoprene, or otherwise), glass or the like. However, a protective layer may be conductive in certain layered configurations.

In any of the embodiment of the present invention, it is contemplated that an adhesive is disposed on either side of the carrier or conductive mediums prior to the heater of the present invention being applied to a specific article (e.g. a seat cover, mirror or otherwise). It is also contemplated that adhesives may be on both sides of the carrier to adhere to one or more additional components associated with the heater such as a protective layer or otherwise. Also, it is contemplated that no adhesives are used in the present invention but instead static electricity or some other self attachment is used to mount or fix the heater to a specified region of the article.

Vehicle Seat and Mirror Applications

Figure 5:
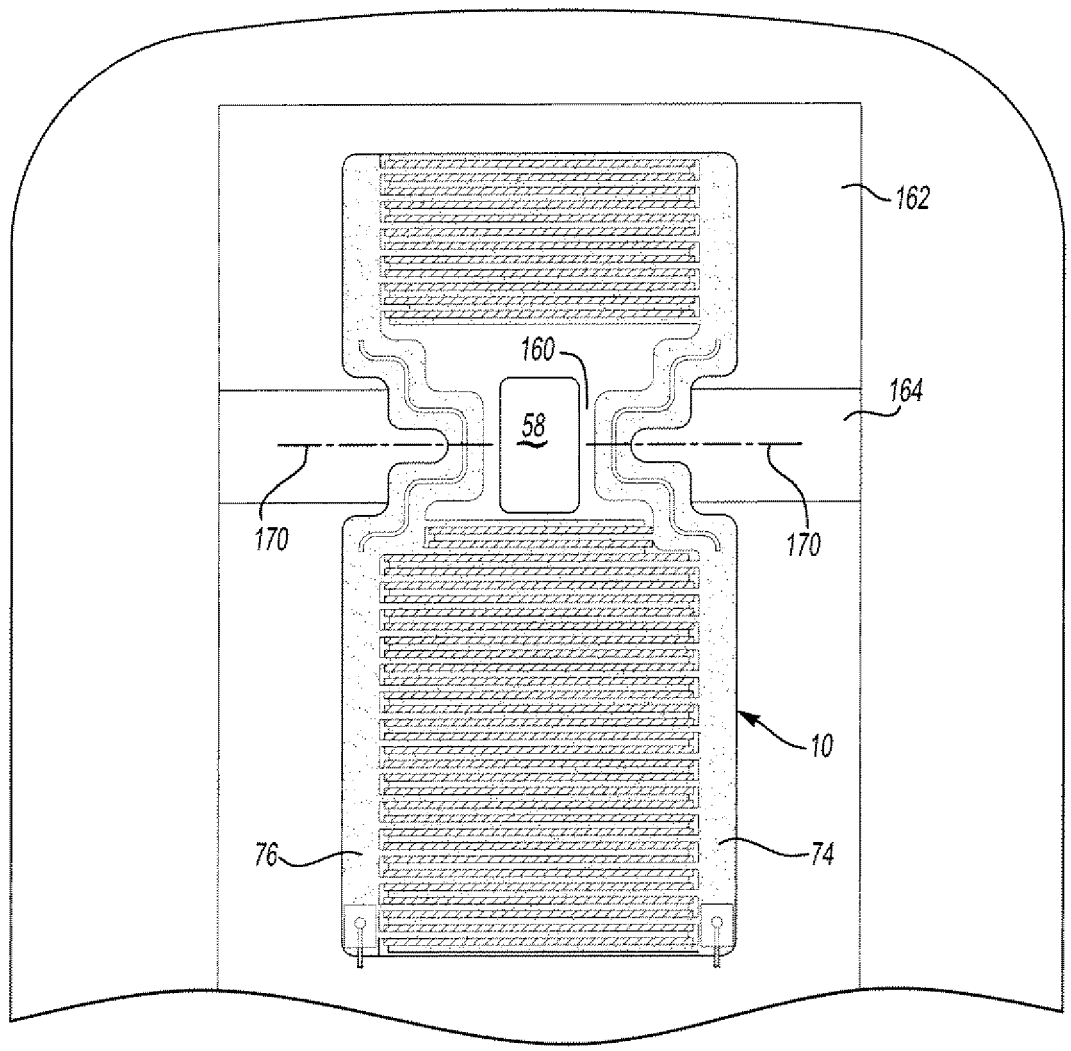
FIG. 5 is a top view of a portion of a seat of an automotive vehicle formed in accordance with an exemplary aspect of the present invention.

As previously discussed, the heater 10 of the present invention may be integrated into various articles of manufacture. Referring specifically to FIGS. 4 and 5, as an example, the heater 10 is shown integrated into a seat 140 of a vehicle. The heater 10 of the present invention may be located in various portions of an automotive vehicle seat such as a support portion, a backrest portion, a shoulder support portion or a headrest. The heater may be located between the trim of the seat and the foam cushioning of the seat. The heater may also be integrated into the trim of the seat, the foam cushioning of the seat or both.

Referring to FIG. 4, the seat 140 is illustrated with the heater 10 of FIG. 2 and 3 positioned in both a seat backrest component 142 and a seat support component 144. In the embodiment illustrated, each component 142, 144 of the seat 140 includes a trim layer 146 and a foam cushion 148 and each of the heaters 10 is positioned substantially between the foam cushion 148 and trim layer 146. Preferably, each heater 10 is fastened to the seat 140 (e.g., the trim layer 146, the cushion 148 or both) for maintaining the heater 10 stationary relative to the seat 140. It is also contemplated that tape 150 (e.g., two-way tape), as shown in FIG. 3, or other fasteners or adhesives may be employed to fasten the heater 10 to the seat 140 and particularly the foam cushion 148.

In a highly preferred embodiment shown in FIG. 5, a central portion 160 of the heater 10 is tied down atop a foam cushion 162 of a seat with the central portion 160 extending at least partially into a cavity 164 (e.g., a trench) of the cushion 162. As shown, tie strings 170 extend through the opening 58 over the top of the central portion 160 of the heater 10 to tie the heater 10 down. Advantageously, the contours 48, 50, 52 of the carrier 18 and the first conductive medium 12 curve about foam cushion 162 at the cavity 164 when the central portion 160 of the heater 10 is extended into the cushion 162 thereby relieving stress that might otherwise be placed upon the first conductive medium 12 and particularly the base portions 74, 76 of the first conductive medium 12. Moreover, the opening 58 also serves to relieve stress as the central portion 160 of the heater 10 is extended into the cushion. While the contours 48, 50, 52 and opening 58 have been employed for relieving stress during application to a foam cushion 162, it should be understood that the contours 48, 50, 52 and opening 58 may also assist in relieving stress wherever the heater 10 curves about an object to which it is applied.

Figure 6:
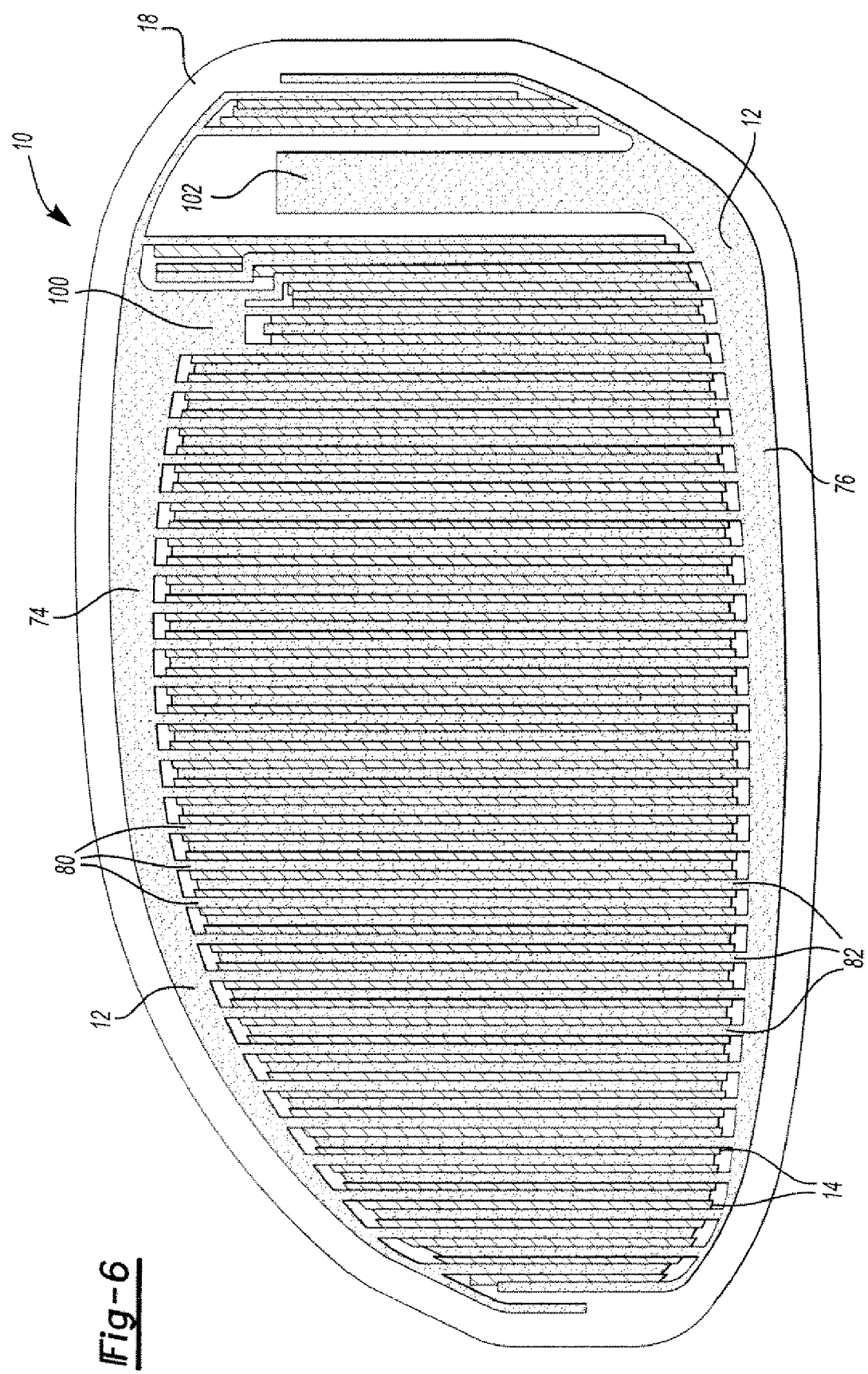
FIG. 6 is a top view of an exemplary heater for an automotive mirror in accordance with an exemplary aspect of the present invention.

In one alternate embodiment, the present invention is integrated with a mirror assembly. In such an embodiment, the shape of the heater, carrier or both is likely to change to the corresponding shape of the mirror assembly. An example of such an embodiment is shown in FIG. 6, wherein the heater 10 is configured with a carrier 18, a first conductive medium 12 and a second conductive medium 14 configured in a manner similar for those previously discussed.

The first conductive medium 12 is preferably configured with a first base portion 74 and a second base portion 76 having associated first and second oppositely charged electrical connectors 100, 102 respectively. Preferably, the shape of the first and second base portions 74, 76, the carrier 18 or both conform to the shape of the mirror 12, backing or both. Furthermore, it is contemplated that the first and second base portions 74, 76 may have varying widths as they extend along the carrier 14.

Extending from the first and second base portions 74, 76 are a plurality of interdigitted first and second extensions 80, 82 having varying lengths (e.g., becoming progressively larger or smaller) according to the contours of the first and second base portions 74, 76 and the contours of the mirror. Preferably the extensions 80, 82 are parallel with respect to each other, however, other configurations are contemplated as disclosed herein. Also, other patterns are contemplated as disclosed herein.

Preferably, each of the sections 70, 72 respectively includes a base portion 74, 76 and a plurality of extensions 80, 82 extending outwardly from the base portions 74, 76. As shown, the plurality of extensions 80 of one section 70 are spaced apart from the plurality of extensions 82 of the other section 72. Moreover, the plurality of extensions 80 of the negative section 70 are spaced apart from each other and the plurality of extensions 82 of the positive section 72 are also spaced apart from each other.

Figure 7:
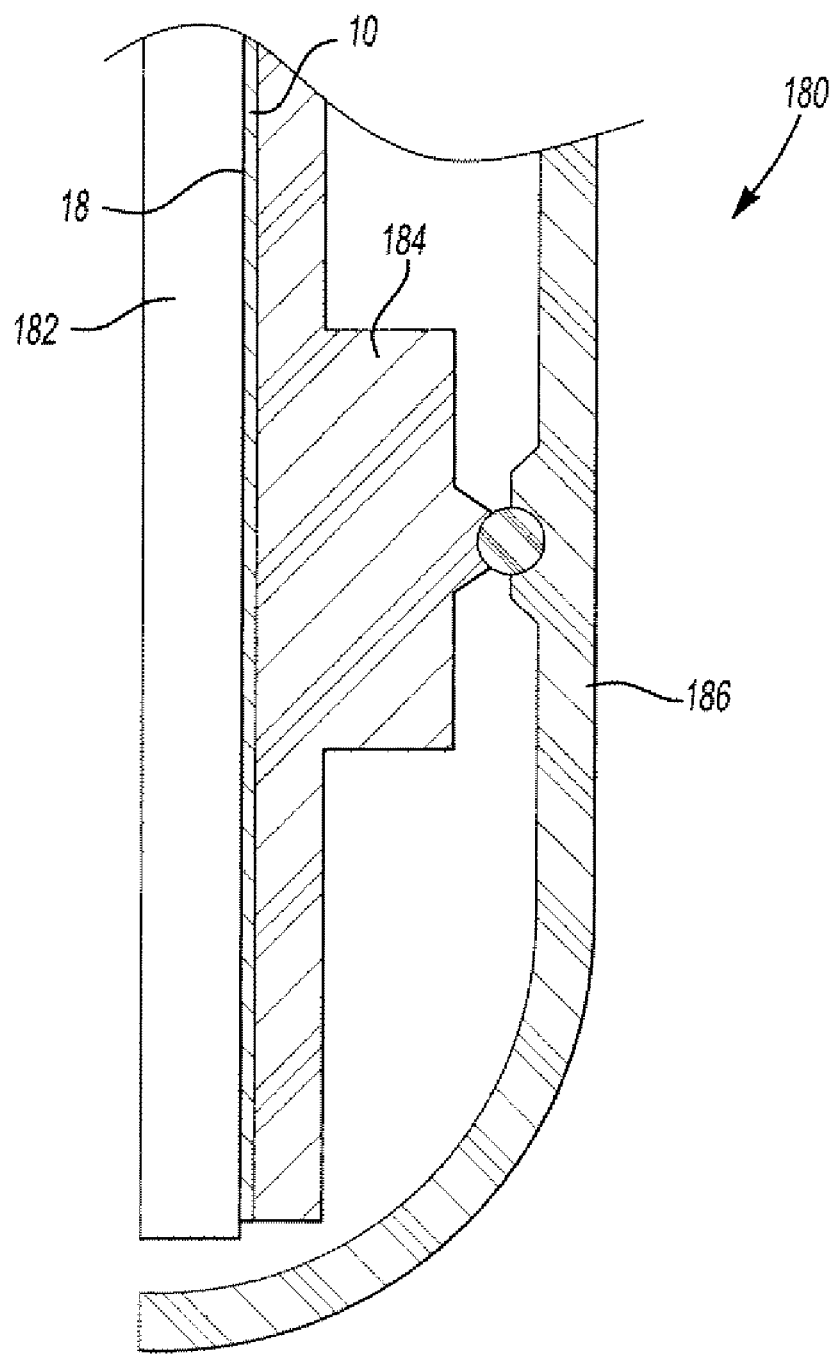
FIG. 7 is a cross-sectional view of a mirror assembly in accordance with an exemplary aspect of the present invention.

Alternatively in another embodiment, referring to FIG. 7, the heater 10 of the present invention may be applied to, or incorporated with, a mirror assembly 180 (e.g. side mirror, rear view mirror, or the like). The mirror assembly 180 is typically configured with a mirror 182, a mirror backing 184 and a housing 186, although each component is not necessarily required. In the illustrated embodiment, the heater 10 includes a carrier 18 that is attached to the mirror 182, the backing 184 or both. Alternatively, however, it is contemplated that the mirror 182 or backing 184 may be the carrier for the conductive mediums of the heater 10.

The carrier 18 may be applied to (e.g. attached to) the mirror 182, the backing 184 or both using a variety of techniques. In one embodiment, the attachment of the heater 10 to the mirror 182 or backing 184 may be accomplished with adhesives, fasteners, combinations thereof or the like. Alternatively, the heater 10 may be attached without the use of adhesives or fasteners. For example, the heater 10 may be statically adhered to the mirror 182 or backing 184. As another alternative, the carrier 18 may be composed of a material having adhesive characteristics for adhering the heater 10 to the mirror assembly 180.

Alternatively or additionally, it is contemplated that the mirror assembly may be configured for securing the heater 10 to itself. For example, the mirror 182, the backing 184 or both may include one or more recesses for receiving and securing the heater 10 thereto. As another example, the heater 10 may be sandwiched and secured between the mirror 182 and the backing 184. Moreover, the mirror assembly 180 may be configured with integral fasteners (e.g. snap-fits) for securing the heater 10.

In addition to the first conductive medium 12 and the second conductive medium 14, the electrical connectors 100, 102 may be directly attached to the mirror 182, the backing 184 or both. Advantageously, any portion of the heater 10 not disposed or incorporated on a portion of the mirror assembly 180, may be adhered or fastened to the mirror assembly 180 using any of the techniques described herein. For example, the mirror 182 or backing 184 may be coated with the second conductive medium 14 while the first conductive 12 medium may be placed over the second conductive 14 according to a different technique. Further, it is contemplated that the mirror 182 contacts either the first conductive medium, the second conductive medium or both. Optionally however, one or more additional layers (e.g. insulating, protective, otherwise or a combination thereof) as described herein may be place over the first conductive medium 12 as desired.

In operation, the heater 10 can operate to heat the mirror 182 in substantially the same manner as the heater can be used to heat a seat. Advantageously, the heater can assist in removing water in the form of condensation, frost or otherwise from the mirror 182.

Operation

In operation, and referring to FIGS. 2 and 4 one electrical connection 102 is connected to a positive terminal of an electrical power source (not shown) and the other connection 100 is connected to a negative terminal of the electrical power source. In turn, when the power source provides electrical energy to the heater 10, an electrical current flows from one electrical connection 100 to the base portion 74 of the negative section 70 of the first conductive medium 12. The electricity then flows to the extensions 80 of the negative section 70 and through the strips 94 of the second conductive medium 14 to the extensions 82 of the positive section 72 of the first conductive medium 12. Thereafter, the electricity flows to and through the base portion 76 of the positive section 72 of the first conductive medium 12 and out of the heater 10 through the electrical connection 102. Due to the resistance of the second conductive medium 14, the strips 94 elevate in temperature thereby heating the seat 10, and particularly the trim 146 of the seat 140. Advantageously, the strips 94 of the second conductive medium 14 exhibit positive thermal coefficient characterization such that the strips 94 are self-limiting with regard to how warm they will become. More specifically, for a particular voltage applied to the second conductive medium 14, the resistance of the second conductive medium 14 will rise, which in turn, causes the current flowing through the second conductive medium 14 to become lower until an equilibrium is attained. As will be recognized by the skilled artisan, various variables such as the voltage applied to the heater, the composition of the second conductive medium 14, the size and configuration of the second conductive medium 14 and others may be varied such that the equilibrium for the medium 14 is achieved at desired heat output. It is also contemplated that, after use, the resistance of the second conductive medium may shift (e.g., upwardly shift) between about 15% and about 25%. If such is the case, it is typically desirable to design the configuration of the second conductive medium to account for the shift while still producing the preferred heat output.

In preferred embodiments, the distance between the positive section of the first conductive medium and the negative section of the first conductive medium (i.e., the distance that the second conductive medium spans to interconnect the sections) may be set to assist in controlling the temperature of the second conductive medium, the heater or both during operation. In the preferred illustrated embodiment, the extensions 82 of the positive section 72 are typically separated from the extensions 80 of the negative section 70 by a distance of about 0.5 millimeter to about 1 centimeter, more preferably about 1.5 millimeters to about 5 millimeters, still more preferably about 3 millimeters. Also in the preferred embodiment, the second conductive medium 14, the heater 10 or both reach a temperature between about 0.0° C. and about 100° C., more preferably between about 25° C. and about 80° C., still more preferably between about 50° C. and about 70° C.

In addition to the previous embodiments, it is also contemplated within the scope of the present invention that the heater can include a first conductive medium having at least three sections, which are interposed by a second conductive medium. In such an embodiment all three sections of the first conductive medium can be electrically connected through the second conductive medium thereby providing the ability to form multiple heating circuits. For example, one or more circuits may be created between a first and second section, the first and third sections, the second and third section or between all three sections. Also, with the use of a first conductive medium having at least three sections, numerous circuits may be selectively generated between any two sections having an interposed second conductive medium. As such, preferred heating regions may be generated.

In this alternate configuration, one section of the first conductive medium is connected to a first or positive terminal and another section is connected to a second or negative terminal of a power supply for forming a first heating circuit. By connecting yet another section of the first conductive medium to the positive or negative terminal of a power supply, a second heating circuit may be generated between this section and any other section (e.g., the aforementioned sections or additional sections) connected to an oppositely charged terminal.

Advantageously, a switching device, as disclosed herein, may be used for selectively and electrically connecting the sections of the first conductive medium to the positive or negative terminal of a power supply. Moreover, it should be understood that the materials discussed for the carrier, the first and second conductive mediums may also be appropriately employed in the following embodiments and may be applied as previously discussed. It is also contemplated that the following embodiments may include an insulation layer that may be formed of the same materials and applied to the carrier, the conductive medium or a combination thereof as described in the previous embodiments. Examples of these types of configurations are disclosed in U.S. patent application Ser. No. 10/715,160, filed Nov. 17, 2003, titled Heater for an Automotive Vehicle and Method of Forming Same, which is expressly incorporated herein by reference for all purposes.

Under various circumstances, but particularly when a vehicle seat is ventilated, it can be desirable for the heater to be breathable. As used herein, the term breathable means that the heater allows fluid (e.g., air) to flow through it (e.g., through the carrier of the heater). The heater may be made breathable by using a fluid permeable carrier such as a substrate formed of multiple strands of material that are combined (e.g., woven together) to form a fabric panel. Exemplary materials for the strands can include natural fibers, synthetic fibers, polymeric strands (e.g., polyamide strands, polyester strands, combinations thereof or the like).

When a carrier is formed of a substantially fluid (e.g., air) impermeable material, a plurality of openings (e.g., at least 2, 4, 10, 20, 50 or more openings) may be formed in the carrier to make the heater, the carrier or both breathable. The openings may be through-holes, slots, slits, combinations thereof or the like and may be shaped and sized as needed to provide the desired amount of breathability and can additionally increase flexibility. Such openings may be formed in any of the substrates mentioned herein for carriers and may be formed by cutting, punching, slicing, drilling, combinations thereof or the like. Alternatively, the carrier may be formed (e.g., molded) according to a process that automatically creates the opening in the carrier. For example, a liquid polymeric material may be shaped in a mold having multiple protrusions such that the polymeric material upon solidifying forms a carrier with multiple openings corresponding to the multiple protrusions. Generally, openings in the heater may extend through the carrier only or may extend through the carrier and any of the other portions of the heater including, but not limited to, the conductive mediums, the sections, the base portions, the extensions, the strips, combinations thereof or the like.

Figure 8:
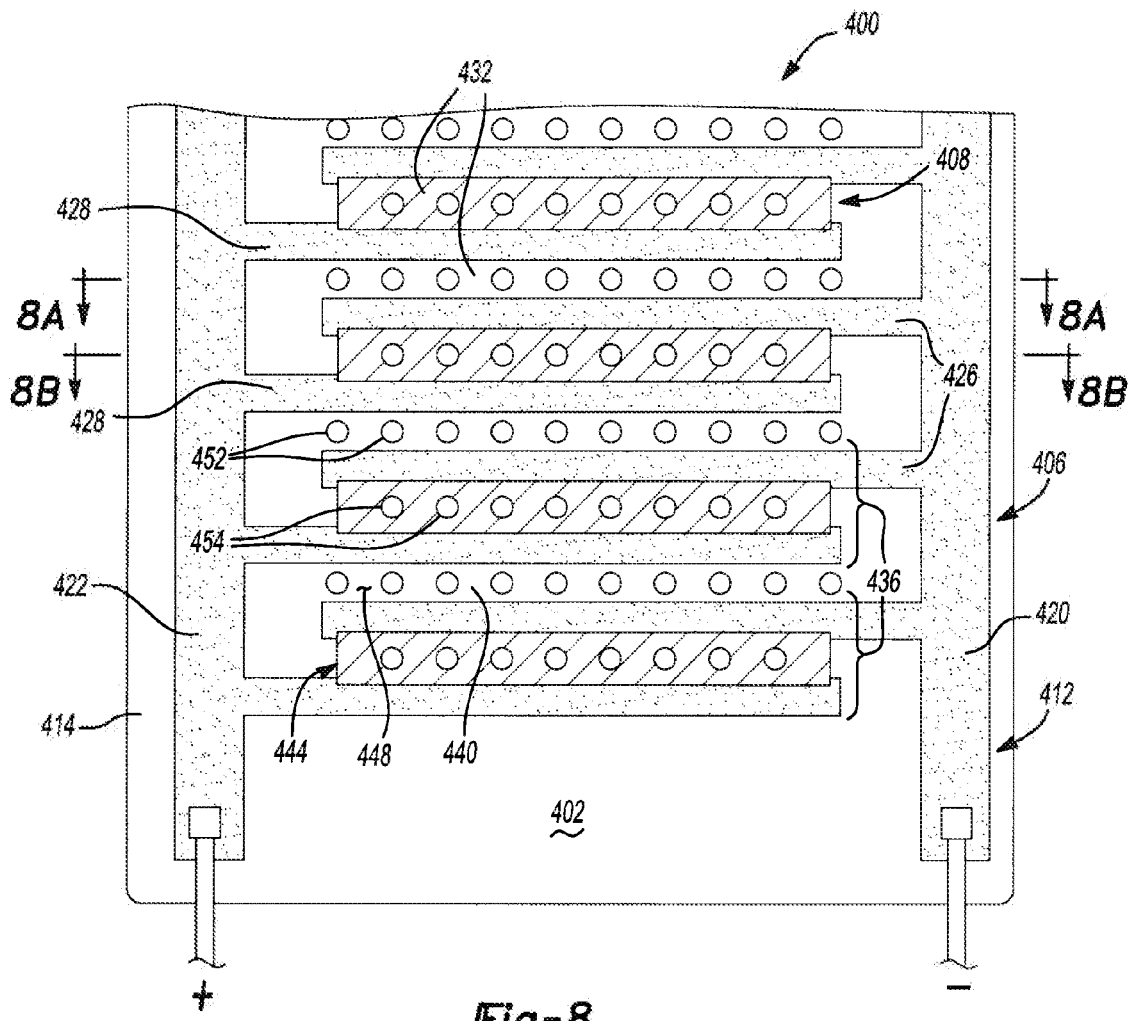
FIG. 8 is a top view of at least a portion of yet another exemplary heater in accordance with an aspect of the invention.
Figure 8A:
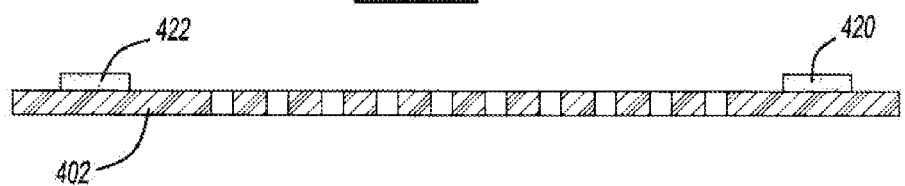
FIG. 8A is a sectional view of the exemplary heater of FIG. 8.
Figure 8B:
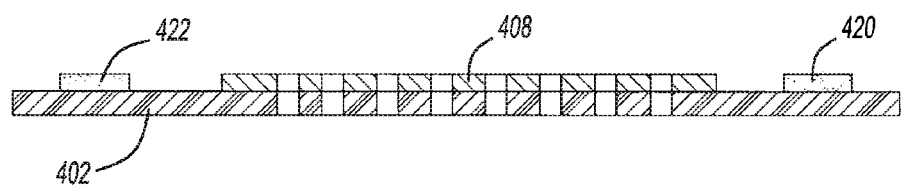
FIG. 8B is a sectional view of the exemplary heater of FIG. 8.

Referring to FIGS. 8, 8A and 8B, there is illustrated one exemplary breathable heater 400 formed in accordance with an aspect of the present invention. As can be seen, the heater 400 includes a carrier 402 with a first conductive medium 406 and a second conductive medium 408 disposed thereon. The first conductive medium 406 is comprised of a first section 412 and a second section 414 which are spatially separated from each other, but electrically interconnected by the second conductive medium 408.

In the particular embodiment illustrated, the first section 412 and second section 414 each respectively include a base portion 420, 422 and multiple extensions 426, 428 extending from the base portions 420, 422. As shown, the extensions 426 of the first section 412 are interdigitated with the extensions 428 of the second section 414. Also, as shown, the second conductive medium 408 is divided into a plurality of masses shown as strips 432. Preferably, although not required, the extensions 426, 428 and the strips 432 extend substantially parallel to each other.

In the embodiment shown, the extensions 426, 428, are divided into sets 436 (e.g., at least 2, 4, 8, 10 or more sets), which are specially separated from each other. Each of the sets includes at least one extension 426 of the first section 412, at least one extension 428 of the second section 414 and at least one mass or strip 432 of the second conductive medium 408. Preferably, the at least one strip 432 electrically interconnects (e.g., physically overlaps) the at least one extension 426 of the first section 412 and the at least one extension 428 of the second section 414 for each set 436. As can be seen, each set 436 is separated from an adjacent set 436 by an open space 440. In other words, each set 436 creates a substantially covered strip 444 of surface area of the carrier 402 and each covered strip 444 of surface area of the carrier 402 is separated by an uncovered strip 448 of surface area of the carrier 402. Preferably, although not required, the uncovered strips 448 are substantially parallel to the covered strips 444 and each of the strips 444, 448 extends from adjacent one base portion 420 to adjacent the other base portion 422.

The heater 400 also includes openings, which in the embodiment illustrated, include one or more sets (e.g., at least 2, 4, 8, 10 or more sets) of first openings 452 and one or more (e.g., at least 2, 4, 8, 10 or more sets) sets of second openings 454. The first openings 452 extend entirely through the carrier 402 and particularly through the uncovered strips 448 of surface area of the carrier 402. The second openings 454 also extend entirely through the carrier 402 and particularly through the covered strips 444 of surface area of the carrier 402. The second openings 454 also extend through the strips 432 of the second conductive medium 408.

While the first openings 452 and second openings 454 of the heater 400 are shown as extending through particular portions of the heater 400, it should be understood, as previously suggested, that the openings may additionally or alternatively through any chosen portion of a heater formed in accordance with the present invention. It should further be understood that such opening may extend through any of the heaters discussed or described herein. Furthermore, if the heater includes an insulation layer disposed over the first and second conductive medium, the openings can extend through that insulation or protective layer as well.

It should be understood that any of the heater designs disclosed herein may made breathable by forming openings in the heaters and/or by otherwise modifying the heaters as described above and with respect to FIG. 10. Advantageously, the breathable heaters can be employed in conjunction with seat ventilation systems such as those described in the following U.S. patent applications: Ser. No. 10/434,890, titled Automotive Vehicle Seat Insert, filed May 9, 2003, and Ser. No. 10/463,052, titled Automotive Vehicle Seating Comfort System, filed Jun. 17, 2003, both of which are incorporated herein by reference for all purposes. Thus, it is contemplated that the heaters and particularly the breathable heaters of the present invention may be employed in conjunction with a seat insert that is designed to move air through a seat cover of a vehicle seat. It is also contemplated that the heaters can overlay a seat cushion that includes an opening therethrough wherein an air mover (e.g. blower) or thermoelectric air mover moves air through the opening to, in turn, move air through a seat cover. Accordingly these ventilation systems can move air through the heaters, the heat assemblies, the carriers or a combination thereof for the present invention.

In another additional or alternative embodiment of the present invention, it is contemplated that any of the heaters discussed herein may be adapted to include slits extending across a substantial portion of a length, width, other dimension or combinations thereof of the substrate or carrier of the heater. Advantageously, when employed in vehicle seats, such slits can provide the heater with increased flexibility and can relieve stresses or strains that might otherwise be placed upon the conductive materials of the heater. Typically such slits extend only through the carrier or the heaters, although they can extend through the conductive materials. It is also typical for such slits to extend through portions of the carrier that are not covered or coated by any of the conductive materials, although not required.

Figure 9:
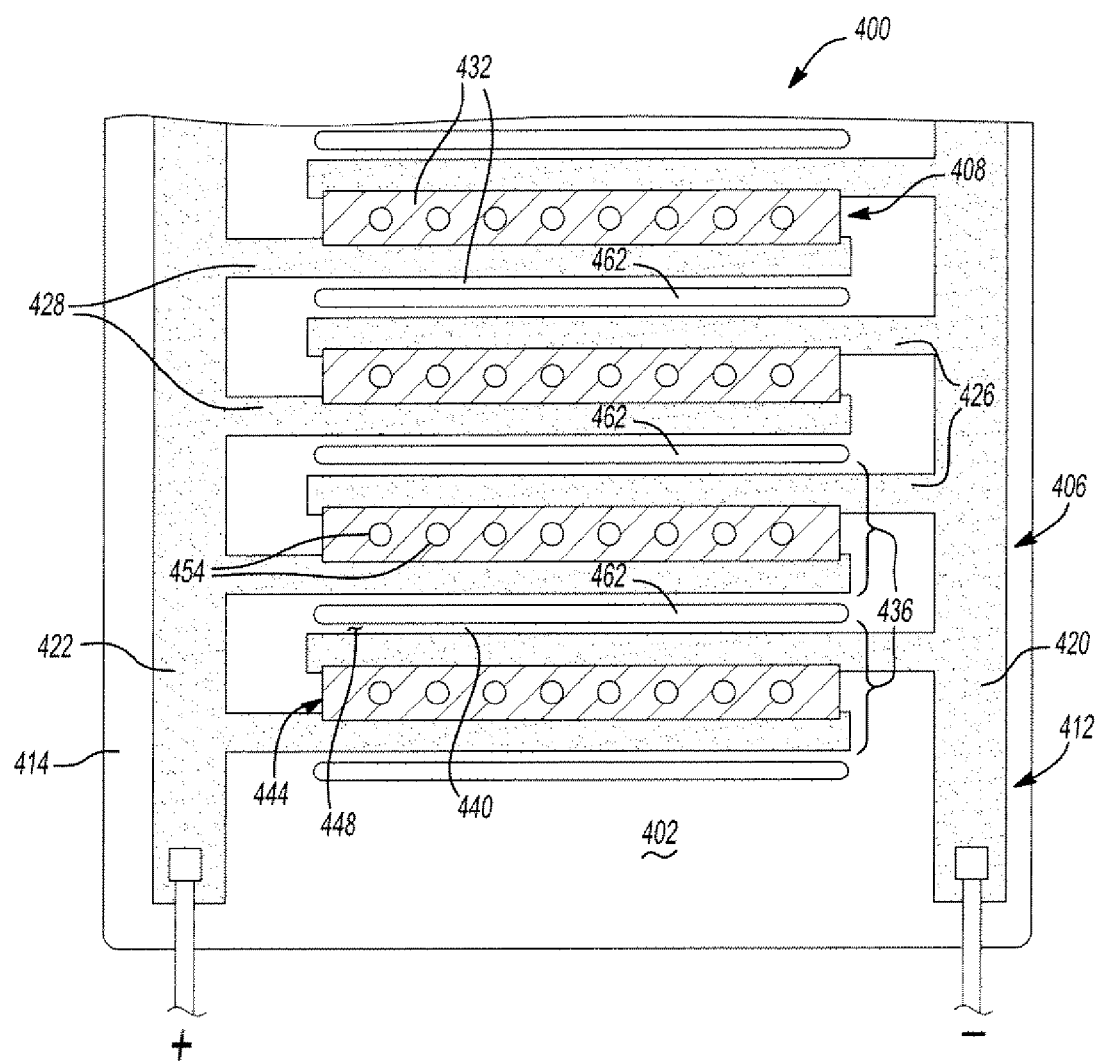
FIG. 9 is a top view of an alternative embodiment of the exemplary heater of FIG. 8.

Referring to FIG. 9, the heater 400 of FIG. 8 has been modified to include slits 462 extending across a substantial portion (e.g., 30%, 60%, 70% or greater) of a dimension (e.g., a width) of the heater 400. It should be understood that the slits can extend substantially continuously across the dimension of the heater or can extend intermittently (e.g., as a group of separate slits) extending across the dimension. As shown, the slits 462 extend through the carrier 402 and extend continuously across the width at, through or along the uncovered strips 448. The strips 462 are also shown as extending substantially parallel to the extensions 426, 428, the strips 444 or a combination thereof.

It will be understood that the components of the heater 400 of FIGS. 8 and 9 including, without limitation, the first conductive medium 406, the second conductive medium 408, the extensions 426, 428, the base portions 420, 422, the carrier 402, the connections or other components may be formed of any of the materials discussed above with respect to such components in other heater embodiments.

In yet another additional or alternative embodiment, it is contemplated that the heater may include a resistive element in series or in parallel with a heater for assisting in controlling the flow of electrical current through the heater. According to this alternative embodiment, it is contemplated that the resistive element may be provided in a variety of configurations. However, in one preferred embodiment, the resistive element is provided as a control element (e.g., a control heater) that is disposed upon the carrier in a manner similar to a main heater.

Figure 10:
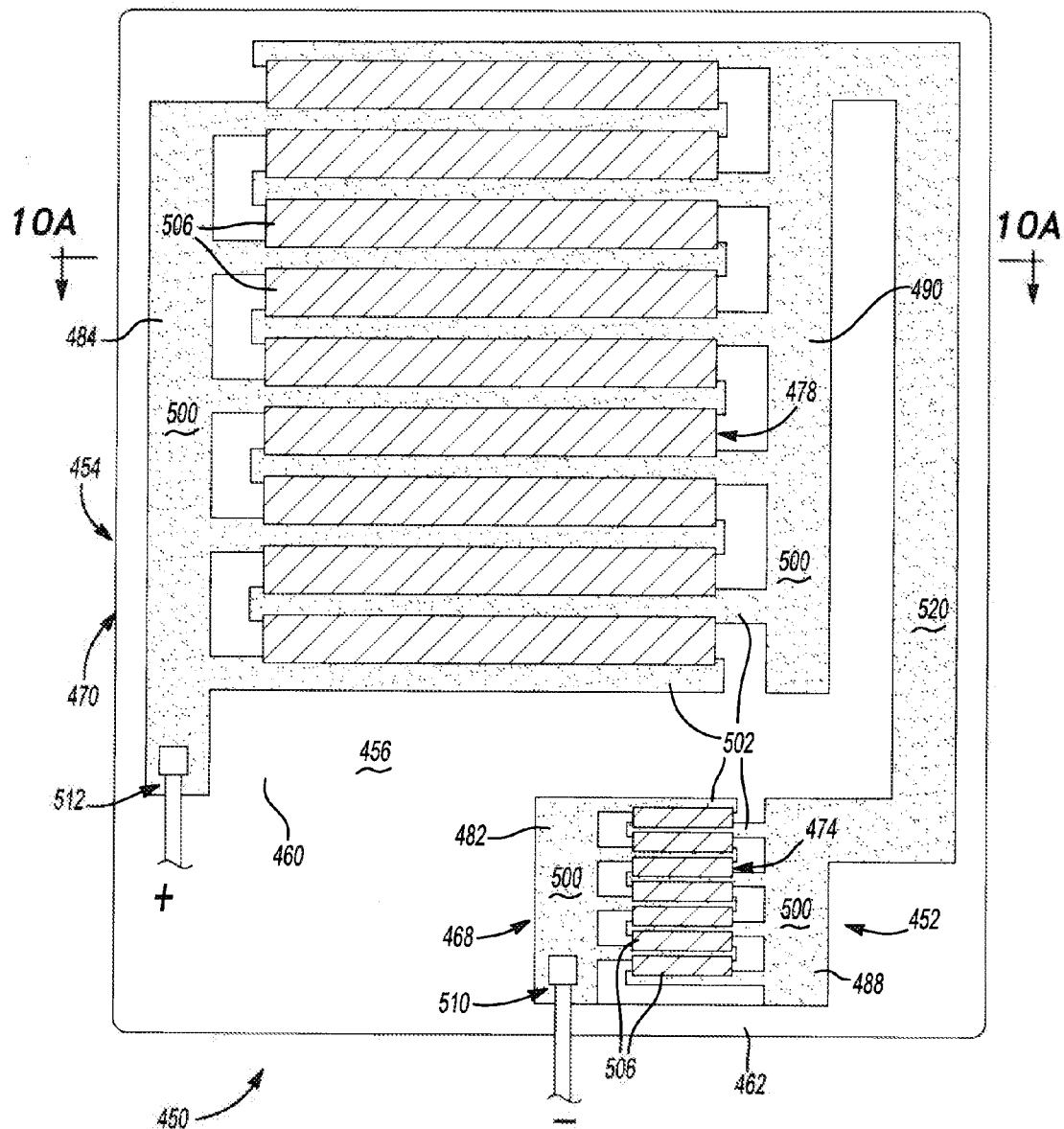
FIG. 10 is a top view of at least a portion of yet another exemplary heater in accordance with as aspect of the invention.
Figure 10A:
FIG. 10A is a sectional view of the exemplary heater of FIG. 10.

Referring to FIGS. 10 and 10A, there is illustrated a heater assembly 450 with a control heater 452 and a main heater 454 disposed upon a carrier 456. In the particular embodiment shown, the main heater 454 is located on a body portion 460 of the carrier 456 and the control heater 452 is disposed upon an extension 462 of the carrier 456 wherein the extension 462 extends away from the body portion 460. Although not required, the control heater 452 typically covers less surface area of the carrier 456 than the main heater 454. In a preferred embodiment, the control heater 452 covers a surface area that is less than half, more preferably less than a quarter and still more preferably less than an eighth of a surface area covered by the main heater 454.

Both the control heater 452 and the main heater 454 respectively include first conductive mediums 468, 470 and second conductive mediums 474, 478. The first conductive mediums 468, 470 are respectively comprised of first sections 482, 484 and second sections 488, 490 which are spatially separated from each other, but electrically interconnected by the second conductive mediums 474, 478.

In the particular embodiment illustrated, the first sections 482, 484 and second sections 488, 490 respectively include base portions 500 and multiple extensions 502 extending from the base portions 500. As shown, the extensions 502 of the first sections 482, 484 are interdigitated with the extensions 502 of the second sections 488, 490. Also, as shown, the second conductive mediums 474, 478 are each divided into a plurality of masses shown as strips 506. Preferably, although not required, the extensions 502 and the strips 506 extend substantially parallel to each other.

The heater assembly 450 also includes at least two electrical connections 510, 512, which are electrically connected to an electrical power source (e.g., a car battery). As shown, one connection 510 is negative (e.g., connects to a negative terminal of the power source) and the other connection 512 is positive (e.g., connects to a positive terminal of the power source). Also, as shown, the The heater assembly 450 also includes at least one connector 520 electrically connecting the first conductive medium 468 of the control heater 452 to the first conductive medium 470 of the main heater 454. In the particular embodiment shown, the connector 520 is an elongated buss bar that extends from the base portion 500 of the second section 488 of the control heater 452 to the base portion 500 of the first section 490 of the main heater 454. In the embodiment shown, the connector 520 is formed of that same material as the first conductive medium of the control heater 452, the main heater 454 or both. It is contemplated, however, that the connector 520 may connect various different components of the heater assembly 450 and may be formed of a variety of material such as electrical wires and electrical connections.

It will be understood that the components of the heater assembly 450 of FIGS. 10 and 10A including, without limitation, the first conductive mediums 468, 470, the second conductive mediums 474, 478, the extensions 502, the base portions 500, the carrier 456, the connections 510, 512 or other components may be formed of any of the materials discussed above with respect to such components in other heater embodiments.

In operation, electrical current preferably flows to and through the first electrical connection 510, the control heater 452 then the connector 520, then the main heater 454 and then the second electrical connection 512. In the control heater 452 shown, the electrical current flows from the base portion 500 of the first section 482 to the extensions 502 of the first section 482, through the second conductive medium 479, to the extensions 502 of the second section 488 and then to the base portion 500 of the second section 488. The current then flows through the connector 520 to and through the base portion 500 of the second section 490 of the main heater 454, then to and through the extensions 502 of the second section 490 followed by flowing through the second conductive medium 506 to the extensions 502 of the first section 484. The current then flows to and through the base portion 500 of the first section 484 and then out through the second electrical connection 512.

Preferably, although not necessarily required, the second conductive medium 474 of the control heater 452 is formed of a PTC material such that, as current flows through the control heater 452 and the temperature of the second conductive medium 474 gets higher, the resistance of the second conductive medium also gets higher until an equilibrium electrical current flow and an equilibrium temperature and/or heat output is achieved for the control heater 452 for any voltage supplied by the power source.

In turn, that equilibrium current then flows to the main heater 454. The second conductive medium 478 of the main heater 454 then produces a temperature or heat output that reflects the equilibrium current delivered to it. In this manner, the control heater 452 controls the current that is provided to the main heater 454 and therefore also at least partially controls the heat output of the main heater 454.

It will be understood that, by employing such a control heater 452, the current delivered to the main heater 454 is controlled. Thus, the second conductive medium 478 of the main heater 454 need not be a PTC material although it could be. The second conductive medium could be a negative temperature coefficient (NTC) material or a constant temperature coefficient (CTC) material or both. Advantageously, such alternative materials can be less expensive, have greater durability or the like.

It should be understood that, when the heater assembly 450 is applied to a seat of an automotive vehicle, the heater assembly 450 can be placed upon a seat such that the main heater 454 spans the main seating area of the seat while the control heater 452 can be located away from such main seating area.

It is even still further contemplated that any of the heaters discussed herein can have a sensor pad incorporated therewith. Typically, the sensor pad is designed to sense or activate when an individual is present or when an individual is not present. The sensor is also typically in signaling communication with the heater for activating the heater when the individual is present and de-activating the heater when the individual is not present.

Figure 11:
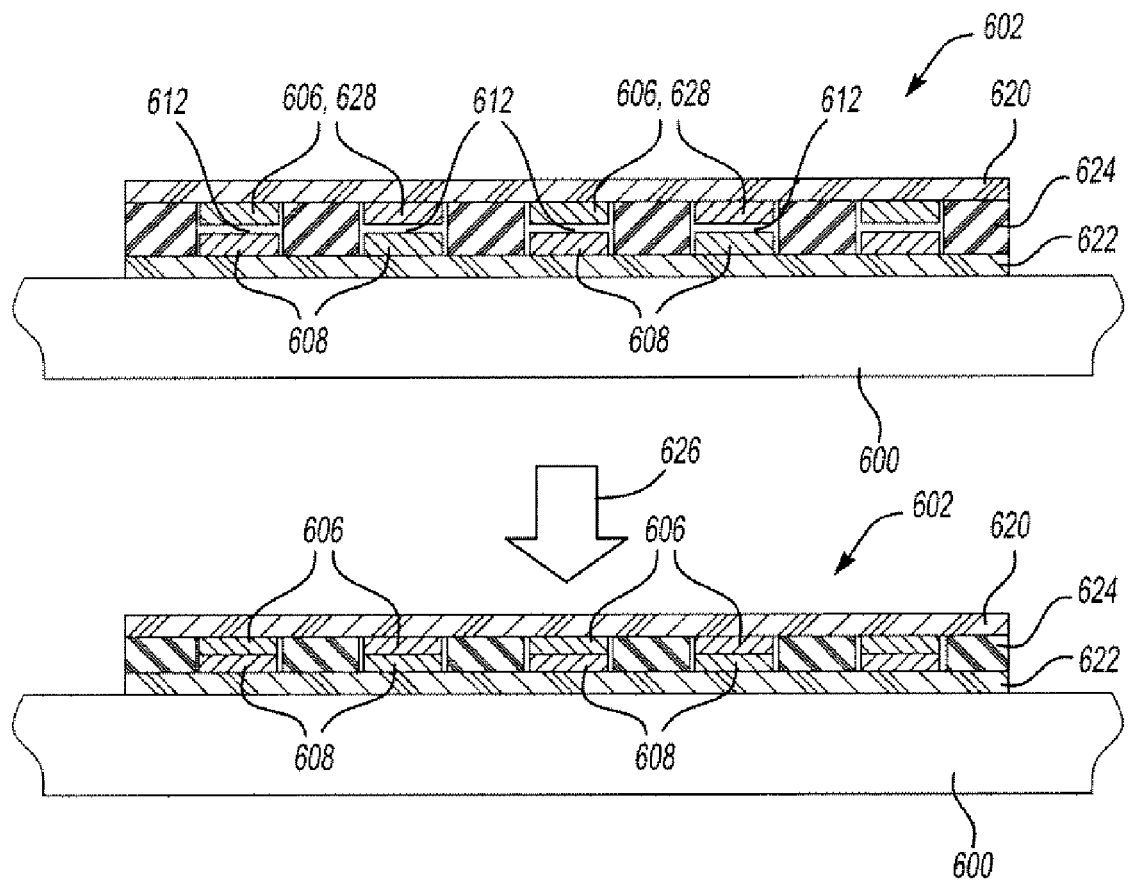
FIG. 11 is a sectional view of an exemplary sensor pad integrated with a heater of the present invention.

In FIG. 11, there is illustrated a heater 600, which may be any of the heaters disclosed herein and may include any of the features or materials of any of those heaters. The heater includes a sensor pad 602, which is particularly useful in conjunction with seat heaters (e.g., vehicle seat heaters), but which may be used with other heaters as well, for detecting whether an individual is seated in a vehicle seat. The sensor pad is typically located above or below the heater and can be attached to (e.g., adhesively secured to) the heater or separate from the heater.

Referring to FIG. 11, the sensor pad 602 typically includes one or more first electrically conductive elements 606 separated from one or more second electrically conductive elements 608 by one or more gaps 612. The first element[s] 606 and the second element[s] 608 are typically in communication with an electrical energy source (e.g., via busses, wires or the like), but the first element[s] 606 are typically in communication separately from the second element[s] 608. When an individual sits down in the seat, the gap[s] 612 are typically closed and the first electrically conductive element[s] 606 contact the second conductive element[s] 608 for closing a circuit that includes the energy source such that electrical current can flow between the first element[s] 606 and second element[s] 608.

Upon closing of the circuit, the sensor pad 602 will typically send an electrical signal via a buss, wire or other electrical element signaling an on condition for the heater 600. The signal may be sent to a controller and then the controller may command electrical current to flow to the heater 600 for activating the heater 600. Alternatively, upon receipt of the signal, the controller may await a signal from another source (e.g., a switch operated by an individual) before commanding current to the heater 600. It is also possible for the sensor pad 602 to be in direct electrical communication with the heater 600 (e.g., part of the same circuit) such that, when the circuit is closed, electrical current automatically flows to the heater 600.

In the embodiment shown in FIG. 11, the first conductive elements 606 are attached to or disposed upon a first layer 620 of material and the second conductive elements 608 are attached to or disposed upon a second layer 622 of material and a third layer 624 of material is intermediate the first and second layers 620, 622. As shown, the first conductive elements 606 generally oppose the second conductive elements 608 and the intermediate layer 624 has several holes 628 that define the gaps 612 between the elements 606, 608. When an individual sits in the seat, the intermediate layer 624 is typically compressed by a force (indicated with arrow 626) to allow the elements 606, 608 to contact each other by having the first elements 606, the second elements 608 or both travel partially or entirely through the holes 628.

It should be understood that the conductive elements may be formed of any of the conductive materials discussed herein or others and may be printed upon or otherwise disposed upon the layers using a variety techniques including those discussed herein and others. Moreover, the layers may be formed of any of the materials discussed in relation to the carriers of the heaters of the present invention.

Figure 11A:
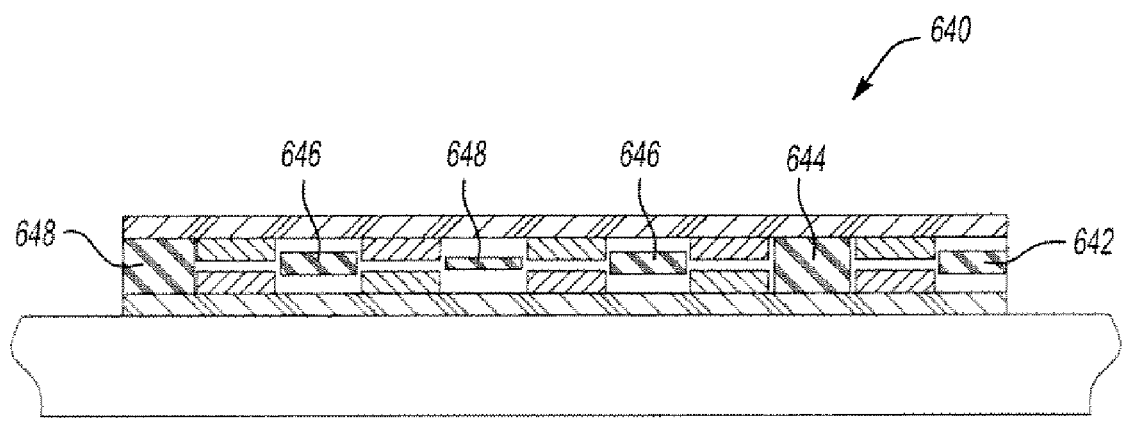
FIG. 11A is a sectional view of another exemplary second pad integrated with a heater of the present invention.

It is additionally contemplated that the sensor pad may be configured to provide two, three or more signals depending upon conditions sensed such as the weight of a person in the seat. In FIG. 11A, a sensor pad 640 is shown to have an intermediate layer 642 of varying thicknesses 644, 646, 648. In such an embodiment, greater force or weight is needed to contact conductive elements adjacent a greater thickness 644 as opposed to contacting conductive elements adjacent a smaller thickness 648. As such, the signal sent by the sensor pad 640 can be varied depending on the weight of an individual in the seat. Such signal can be employed to assist in controlling air bag deployment or other systems.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. An article of manufacture, comprising:
  a carrier of the article of manufacture, the carrier having a surface;
  a heater overlaying the surface, the heater including;
  i) a flexible carrier;
  ii) a first conductive medium disposed upon the carrier wherein the first conductive medium includes a negative section having a plurality of first extensions and a positive section having a plurality of second extensions; and
  iii) a second conductive medium electrically connecting the positive section with the negative section;
  wherein a plurality of openings extend through the heater;
  wherein the plurality of openings is divided into a plurality of sets of openings; and
  wherein the flexible carrier includes a plurality of strips of uncovered surface area and each of the strips of uncovered surface area is located between at least one of the first extensions and at least one of the second extensions and each of the strips of uncovered surface area includes one or more of the sets of openings extending therethrough.

2. An article of manufacture as in claim 1 wherein the second conductive medium includes a plurality of strips, each of the strips in overlapping relation with one of the plurality of first extensions and one of the plurality of second extensions, the plurality of strips also extending substantially parallel to the first and second extensions.

3. An article of manufacture as in claim 1 wherein the openings are slits that extend through the flexible carrier.

4. An article of manufacture as in claim 1 wherein at least one of the flexible carrier, the first conductive medium and second medium are formed of a polymeric material.

5. An article of manufacture as in claim 1 wherein the carrier of the article of manufacture is a portion of a seat of an automotive vehicle.

6. An article of manufacture as in claim 1 wherein the flexible carrier includes a plurality of strips of covered surface area between the strips of uncovered surface area wherein the strips of covered surface area are covered by the second conductive medium.

7. An article of manufacture as in claim 6 wherein each of the strips of covered surface area includes one or more of the sets of openings extending therethrough.

8. An article of manufacture as in claim 7 wherein the plurality of sets of openings includes at least 4 sets of openings and in each set of openings includes at least 4 openings an article of manufacture wherein the plurality of openings includes at least 10 openings.

9. An article of manufacture as in claim 1 wherein an air mover is provided to circulate air through the plurality of openings extended through the heater.

10. An article of manufacture as in claim 9 wherein the air mover is a blower.

11. An article of manufacture comprising:
  a carrier of the article of manufacture, the carrier having a surface;
  a heater assembly including a control element and a main heater disposed upon a flexible carrier, wherein:
  i) the control element includes a first conductive medium formed of a PTC material; and
  ii) the main heater include a first conductive material formed of an NTC or CTC material;
  wherein electrical current flows through the control element to and through the main heater such that the control element controls the amount of electrical current flowing through the main heater; and
  wherein the control element is a control heater that covers a surface area of the flexible carrier that is less than half of a surface area that is covered by the main heater.

12. An article of manufacture as in claim 11 wherein the surface area covered by the control heater is less than one quarter the surface area covered by the main heater.

13. An article of manufacture as in claim 11 wherein the main heater is located on a body portion of the flexible carrier and the control heater is locate on an extension of the flexible carrier.

14. An article of manufacture as in claim 11 wherein at least one of the NTC material, the PTC material and the flexible carrier are formed of a polymeric material.

15. An article of manufacture as in claim 11 wherein openings extend through the carrier and an air mover is provided to move air through the openings.

16. An article of manufacture as in claim 11 wherein the carrier of the article of manufacture is part of a seat of an automotive vehicle.

17. An article of manufacture, comprising:
  a carrier of the article of manufacture, the carrier having a surface wherein the carrier of the article of manufacture is a portion of a seat of an automotive vehicle;
  a heater overlaying the surface, the heater including;
  i) a flexible carrier;
  ii) a first conductive medium disposed upon the carrier wherein the first conductive medium includes a negative section having a plurality of first extensions and a positive section having a plurality of second extensions; and
  iii) a second conductive medium electrically connecting the positive section with the negative section, wherein the second conductive medium includes a plurality of strips, each of the strips in overlapping relation with one of the plurality of first extensions and one of the plurality of second extensions, the plurality of strips also extending substantially parallel to the first and second extensions;
wherein
i) a plurality of openings extend through the heater;
ii) the plurality of openings is divided into a plurality of sets of openings; and
iii) the flexible carrier includes a plurality of strips of uncovered surface area and each of the strips of uncovered surface area is located between at least one of the first extensions and at least one of the second extensions and each of the strips of uncovered surface area includes one or more of the sets of openings extending therethrough.

18. An article of manufacture as in claim 17 wherein the openings extend through the flexible carrier only.

19. An article of manufacture as in claim 17 wherein the openings extend through the second conductive medium and the flexible carrier only.

20. An article as in claim 17 wherein:
i) the carrier of the heater and the first conductive medium cooperatively define at least one contour, which bends about a contour of the article;
ii) the carrier of the heater has an hour-glass shape;
iii) the second conductive medium is a PTC material;
iv) the carrier is formed of a material having an elongation at failure greater than 50%; and
v) the first and second conductive mediums are coated with a protective dielectric coating formed of a polymeric dielectric composition.

21. An article of manufacture as in claim 20 wherein the plurality of sets of openings includes at least 4 sets of openings and each set of openings includes at least 4 openings and wherein the plurality of openings includes at least 20 openings.

22. An article of manufacture as in claim 17 wherein the a sensor pad is integrated with the heater and the sensor pad is in signaling communication with the heater for assisting in activating the heater when an occupant is present in the vehicle seat and for deactivating the heater when an occupant is not present in the vehicle seat.

* * * * *